United States Patent
Riemenschneider et al.

(10) Patent No.: US 12,430,857 B2
(45) Date of Patent: *Sep. 30, 2025

(54) NEURAL EXTENSION OF 3D CONTENT IN AUGMENTED REALITY ENVIRONMENTS

(71) Applicant: DISNEY ENTERPRISES, INC., Burbank, CA (US)

(72) Inventors: Hayko Jochen Wilhelm Riemenschneider, Zurich (CH); Erika Varis Doggett, Los Angeles, CA (US); Evan Matthew Goldberg, Burbank, CA (US); Shinobu Hattori, Los Angeles, CA (US); Christopher Richard Schroers, Uster (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 18/155,626

(22) Filed: Jan. 17, 2023

(65) Prior Publication Data

US 2024/0242444 A1 Jul. 18, 2024

(51) Int. Cl.
*G06T 19/00* (2011.01)
*G06V 10/26* (2022.01)
*G06V 10/82* (2022.01)

(52) U.S. Cl.
CPC ............ *G06T 19/006* (2013.01); *G06V 10/26* (2022.01); *G06V 10/82* (2022.01)

(58) Field of Classification Search
CPC ..... G06T 19/006; G06T 15/20; G06T 15/205; G06V 10/82; G06V 10/26
See application file for complete search history.

(56) References Cited

U.S. PATENT DOCUMENTS

| | | |
|---|---|---|
| 11,210,843 B1 | 12/2021 | Coffey et al. |
| 2012/0229508 A1 | 9/2012 | Wigdor et al. |
| 2019/0371279 A1 | 12/2019 | Mak |
| 2020/0111256 A1* | 4/2020 | Bleyer .............. G06F 3/011 |
| 2020/0226736 A1* | 7/2020 | Kar .................. H04N 13/271 |
| 2021/0142497 A1 | 5/2021 | Pugh et al. |

(Continued)

FOREIGN PATENT DOCUMENTS

| | | |
|---|---|---|
| JP | 2014-515130 A | 6/2014 |
| JP | 2020-042802 A | 3/2020 |

(Continued)

OTHER PUBLICATIONS

Extended European Search Report for Application No. 24152403.2 dated Jun. 24, 2024.

(Continued)

*Primary Examiner* — Antonio A Caschera
(74) *Attorney, Agent, or Firm* — Squire Patton Boggs LLP; Sarah Mirza

(57) ABSTRACT

Generating augmented reality content includes inputting a first layout of a physical space and a first set of anchor content into a machine learning model; generating, via execution of the machine learning model, a first augmented reality view that includes (i) a first portion of the physical space and (ii) an extension of the first set of anchor content across a second portion of the physical space; and causing the first augmented reality view to be outputted in a computing device.

19 Claims, 7 Drawing Sheets

(56) References Cited

U.S. PATENT DOCUMENTS

| | | |
|---|---|---|
| 2021/0173968 A1 | 6/2021 | Yang et al. |
| 2021/0201565 A1 | 7/2021 | Dibra et al. |
| 2021/0241109 A1 | 8/2021 | Jie |
| 2021/0373834 A1 | 12/2021 | Goldberg et al. |
| 2021/0383595 A1 | 12/2021 | Chapman et al. |

FOREIGN PATENT DOCUMENTS

| | | |
|---|---|---|
| JP | 2021-527247 A | 10/2021 |
| JP | 2022-505775 A | 1/2022 |

OTHER PUBLICATIONS

Extended European Search Report for Application No. 24152408.1 dated Jun. 24, 2024.

Teterwak et al., "Boundless: Generative Adversarial Networks for Image Extension", Aug. 19, 2019, pp. 10521-10530.

Frueh et al., "Headset Removal for Virtual and Mixed Reality", Proceedings of SIGGRAPH Talks, DOI: http://dx.doi.org/10.1145/3084363.3085083, Jul. 30-Aug. 3, 2017, 2 pages.

Koh et al. "Simple and Effective Synthesis of Indoor 3D Scenes", The Thirty-Seventh AAAI Conference on Artificial Intelligence, Dec. 1, 2022, pp. 1169-1178.

ARCore, "Working with Anchors", Google Developers, Retrieved from https://developers.google.com/ar/develop/anchors, on Nov. 30, 2022, 5 pages.

Azure, "Object Anchors", Microsoft, Retrieved from https://azure.microsoft.com/en-us/services/object-anchors, on Nov. 30, 2022, 12 pages.

Niantic Lightship, "Build the Real-World Metaverse", Retrieved from https://lightship.dev, on Nov. 30, 2022, 8 pages.

"DALL-E 2", Retrieved from https://openai.com/dall-e-2, on Nov. 30, 2022, 14 pages.

Google Research, Brain Team, "Imagen: Text-to-Image Diffusion Models", Retrieved from https://imagen.research.google, on Nov. 30, 2022, 18 pages.

Bastian, Matthias, "The Decoder", What would Mona Lisa look like with a body? DALL-E 2 has an answer, Retrieved from https://mixed-news.com/en/what-would-mona-lisa-look-like-with-a-body-dall-e-2-has-an-answer/, on Nov. 30, 2022, 8 pages.

Sketchfab, "Persistence of Memory 3D", Retrieved from https://sketchfab.com/3d-models/persistence-of-memory-3d-ffe139656cc241f28d5dc95dd80ccc64, on Nov. 30, 2022, 6 pages.

U.S. patent application entitled, "Space and Content Matching for Augmented and Mixed Reality", U.S. Appl. No. 17/749,005, filed May 19, 2022, 33 pages.

U.S. patent application entitled, "Augmented Reality Enhancement of Moving Images", U.S. Appl. No. 17/887,731, filed Aug. 15, 2022, 35 pages.

U.S. patent application entitled, "User Responsive Augmented Reality Enhancement of Moving Images", U.S. Appl. No. 17/887,742, filed Aug. 15, 2022, 42 pages.

U.S. patent application entitled, "Dynamic Scale Augmented Reality Enhancement of Images", U.S. Appl. No. 17/887,754, filed Aug. 15, 2022, 40 pages.

Non Final Office Action received for U.S. Appl. No. 18/155,635 dated Sep. 5, 2024, 22 pages.

Office Action received for Japanese Application No. 2023-209927 dated Jan. 22, 2025, 5 pages.

Office Action received for Japanese Application No. 2023-209931 dated Jan. 22, 2025, 5 pages.

Final Office Action received for U.S. Appl. No. 18/155,635 dated Jan. 17, 2025, 18 pages.

\* cited by examiner

NEURAL EXTENSION OF 3D CONTENT IN AUGMENTED REALITY ENVIRONMENTS

BACKGROUND

Field of the Various Embodiments

Embodiments of the present disclosure relate generally to machine learning and augmented reality and, more specifically, to neural extension of three-dimensional (3D) content in augmented reality environments.

Description of the Related Art

Augmented reality (AR) refers to the merging of real-world and computer-generated content into an interactive sensory experience. For example, an AR system could include a camera, depth sensor, microphone, accelerometer, gyroscope, and/or another type of sensor that detects events or changes in the environment around a user. The AR system could also include a display, speaker, and/or another type of output device that combines data collected by the sensors with additional AR content into an immersive experience. The AR system could additionally modify the output of real-world and/or AR content in response to changes in the environment, interaction between the user and the AR content, and/or other input.

One application of AR involves combining traditional media content, such as images, audio, and/or video, with the layout of a real-world physical space. For example, an AR system executing on a wearable device or portable electronic device could "extend" an image or video of a scene across a room by overlaying objects, shapes, colors, and/or textures from the scene onto walls, ceilings, floors, and/or other parts of the room. The AR system could also arrange various portions of the scene around doors, windows, and/or other types of objects in the room so that the content appears to "flow" around these objects instead of occluding the objects.

However, an AR environment that combines traditional media content with the layout of a physical space is typically generated via a time- and resource-intensive process. For example, a team of artists or other content creators could interact with a suite of applications to convert objects, shapes, colors, and/or textures from an image or video of a scene into AR assets. A different team of developers would subsequently interact with a different suite of applications to resize the AR assets, position and orient the augmented reality assets within an AR environment that incorporates the layout of the physical space, and/or otherwise customize the placement of the AR assets to the layout of the physical space. The process would then be repeated for each piece of traditional media content and each physical space into which the traditional media content is to be extended.

As the foregoing illustrates, what is needed in the art are more effective techniques for incorporating traditional media content into AR environments.

SUMMARY

One embodiment of the present invention sets forth a technique for generating augmented reality (AR) content. The technique includes inputting a first layout of a physical space and a first set of anchor content into a machine learning model. The technique also includes generating, via execution of the machine learning model, a first three-dimensional (3D) volume that includes (i) a first subset of the physical space and (ii) a placement of one or more 3D representations of the first set of anchor content in a second subset of the physical space. The technique further includes causing one or more views of the first 3D volume to be outputted in a computing device.

One technical advantage of the disclosed techniques relative to the prior art is the ability to automatically and seamlessly generate AR content that combines anchor content with the layout of a physical space. Accordingly, the disclosed techniques are more time- and resource-efficient than conventional approaches that use various software components to convert traditional media content into AR assets and manually place the AR assets within an AR environment. Another technical advantage of the disclosed techniques is the ability to generate AR content "on the fly" from a given set of anchor content and a given physical space. Consequently, the disclosed techniques increase the diversity and availability of AR content that combines traditional media content with layouts of physical spaces. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
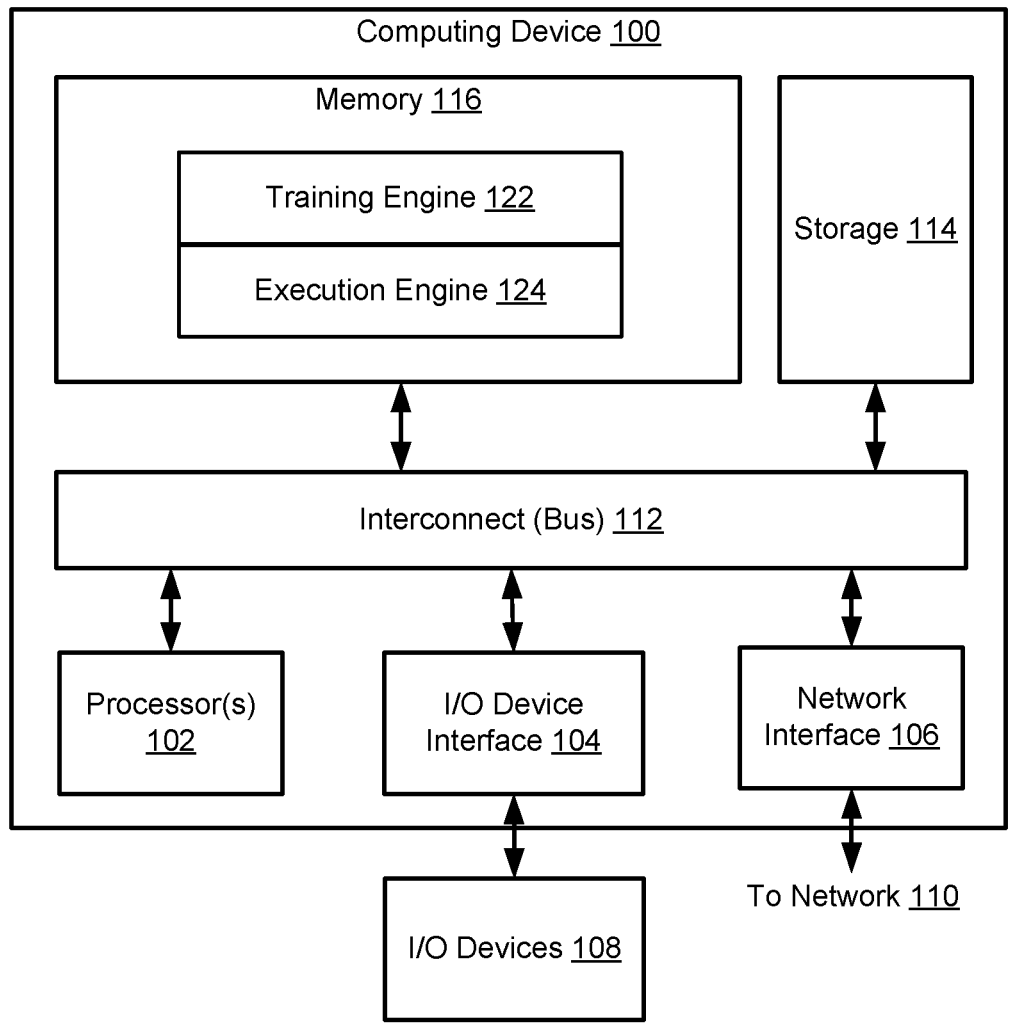
FIG. 1 illustrates a system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in memory 116.

It is noted that the computing device described herein is illustrative and that any other technically feasible configurations fall within the scope of the present disclosure. For example, multiple instances of training engine 122 and execution engine 124 could execute on a set of nodes in a distributed and/or cloud computing system to implement the functionality of computing device 100. In another example, training engine 122 and/or execution engine 124 could execute on various sets of hardware, types of devices, or environments to adapt training engine 122 and/or execution engine 124 to different use cases or applications. In a third example, training engine 122 and execution engine could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, a microphone, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122 and execution engine 124 may be stored in storage 114 and loaded into memory 116 when executed.

Memory 116 includes a random-access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 trains one or more machine learning models to generate augmented reality (AR) environments that incorporate traditional media content into physical spaces. For example, training engine 122 could train one or more neural networks to extend a two-dimensional (2D) scene depicted in an image and/or video across walls, ceilings, floors, and/or other surfaces of a room. Training engine 122 could also, or instead, train one or more neural networks to generate a three-dimensional (3D) volume that incorporates objects, colors, shapes, textures, structures, and/or other attributes of the 2D scene into the layout of the room.

Execution engine 124 uses the trained machine learning model(s) to generate AR environments that combine traditional media content with layouts of physical spaces. For example, execution engine 124 could input a physical layout of a room and anchor content that includes an image or video depicting a scene into a trained neural network. Execution engine 124 could use the trained neural network to depict chairs, tables, windows, doors, and/or other objects in the room in a normal fashion while extending the scene across the walls, ceilings, floors, and/or other surfaces of the room. Execution engine 124 could also, or instead, use the trained neural network to generate a 3D volume that places 2D and/or 3D representations of objects, colors, shapes, textures, and/or other attributes of the 2D scene into the room.

Neural Generation of Augmented Reality Environments from Anchor Content

Figure 2A:
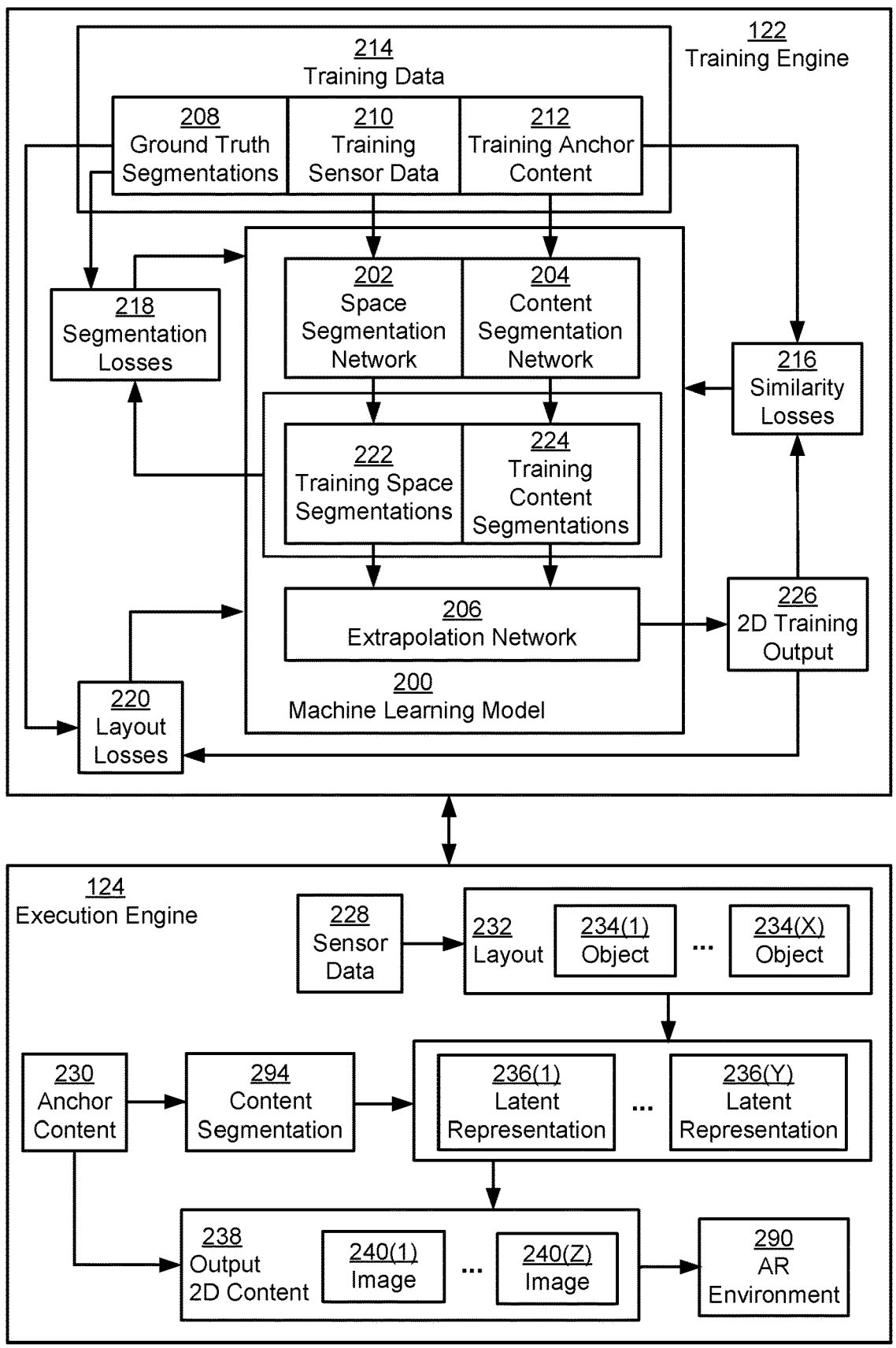
FIG. 2A is a more detailed illustration of the training engine and execution engine of FIG. 1, according to various embodiments.

FIG. 2A is a more detailed illustration of training engine 122 and execution engine 124 of FIG. 1, according to various embodiments. More specifically, FIG. 2A illustrates the operation of training engine 122 and execution engine 124 in using a machine learning model 200 to generate an AR environment 290 that extends a set of anchor content 230 across a layout 232 of a physical space.

Anchor content 230 includes one or more pieces of any type of media that can be incorporated into AR environment 290. For example, a given set of anchor content 230 could include a single image, multiple images, one or more video frames, one or more visualizations, one or more 3D models, one or more audio files, one or more text strings, and/or another type of digital content that can be overlaid and/or combined with a "real world" setting into AR environment 290.

In one or more embodiments, anchor content 230 is outputted and/or captured within the physical space that is incorporated into AR environment 290. For example, anchor content 230 could include an image, video, sound, and/or another type of media content that is outputted by a television, projector, display, speaker, and/or another type of output device within a room corresponding to the physical space. In another example, anchor content 230 could include a painting, photograph, mural, sculpture, sound, and/or another type of physical object or phenomenon that is present in the room or detected from the room. Anchor content 230 could additionally be specified by a user interacting with AR environment 290 using a bounding box or bounding shape, via a calibration process that involves displaying a known image on an output device prior to displaying anchor content 230, and/or via another method.

Anchor content 230 can also, or instead, exist separately from the physical space across which anchor content 230 is to be extended. For example, anchor content 230 could be specified as one or more files that include one or more images, video, audio, 3D models, text, and/or another type of content that can be retrieved from a data store and incorporated into AR environment 290. In another example, a user interacting with AR environment 290 could generate and/or update anchor content 230 by "drawing" or "painting" anchor content 230 using a touchscreen and/or another type of input device.

Machine learning model 200 includes a space segmentation network 202, a content segmentation network 204, and an extrapolation network 206. In some embodiments, space segmentation network 202, content segmentation network 204, and extrapolation network 206 are implemented as neural networks and/or other types of machine learning models. For example, space segmentation network 202, content segmentation network 204, and extrapolation network 206 could include, but are not limited to, one or more convolutional neural networks, fully connected neural networks, recurrent neural networks, residual neural networks, transformer neural networks, autoencoders, variational autoencoders, generative adversarial networks, autoregressive models, bidirectional attention models, mixture models, diffusion models, and/or other types of machine learning models that can process and/or generate content.

More specifically, machine learning model 200 generates output 2D content 238 that is incorporated into AR environment 290 based on anchor content 230 and layout 232. Layout 232 includes the positions and/or orientations of objects 234(1)-234(X) (each of which is referred to individually as object 234) in a physical space. For example, layout 232 could include a 2D or 3D "map" of a room. The map includes a semantic segmentation of the room into different regions corresponding walls, floor, ceiling, door, table, chair, rug, window, and/or other objects in the room.

In one or more embodiments, layout 232 is generated by space segmentation network 202 based on sensor data 228 associated with the physical space. For example, sensor data 228 could include images, depth maps, point clouds, and/or another representation of the physical space. Sensor data 228 could be collected by cameras, inertial sensors, depth sensors, and/or other types of sensors on an augmented reality device and/or another type of computing device within and/or in proximity to the physical space. Sensor data 228 could also be used to generate a 2D or 3D model corresponding to a "virtual twin" of the physical space. Sensor data 228 and/or the virtual twin could be inputted into space segmentation network 202, and predictions of objects and/or categories of objects for individual elements (e.g., pixel locations, points in a point cloud, etc.), locations, or regions in sensor data 228 and/or the virtual win could be obtained as output of space segmentation network 202.

In some embodiments, anchor content 230 is similarly processed by content segmentation network 204 to generate a content segmentation 294. For example, one or more images in anchor content 230 could be inputted into content segmentation network 204, and content segmentation 294 could be obtained as predictions of objects and/or categories of objects (e.g., foreground, background, clouds, stars, objects, animals, plants, faces, structures, shapes, settings, etc.) generated by content segmentation network 204 for individual pixel locations and/or other subsets of the image (s).

Anchor content 230, sensor data 228, layout 232, and/or content segmentation 294 are provided as input into extrapolation network 206. In response to the input, extrapolation network 206 generates latent representations 236(1)-236(Y) (each of which is referred to individually as latent representation 236) of various portions of the inputted data. Extrapolation network 206 also converts latent representations 236 into output 2D content 238 that includes a number of images 240(1)-240(Z) (each of which is referred to individually as image 240).

In some embodiments, each image 240 in output 2D content 238 represents one or more portions of the physical space and depicts a semantically meaningful extension of anchor content 230 into the physical space. For example, output 2D content 238 could include six images 240 corresponding to six surfaces of a cube that represents a standard box-shaped room. In another example, output 2D content 238 could include one or more images 240 that depict a 360-degree, spherical, and/or another type of "panorama" view of a physical space that is not limited to a box-shaped room. In both examples, each image 240 could include real-world objects in the room, such as (but not limited to) doors, windows, furniture, and/or decorations. Each image 240 could also include various subsets of anchor content 230 (as identified in content segmentation 294) overlaid onto the walls, floor, ceiling, and/or other surfaces in the room. These components of anchor content 230 could additionally be positioned or distributed within the corresponding images 240 to avoid occluding and/or overlapping with doors, windows, furniture, decorations, and/or certain other types of objects in the room.

Training engine 122 trains machine learning model 200 using training data 214 that includes a set of ground truth segmentations 208, a set of training sensor data 210, and a set of training anchor content 212. Training sensor data 210 includes images, point clouds, and/or other digital representations of the visual and/or spatial attributes of various types of physical spaces. For example, training sensor data 210 could include 2D and/or 3D representations of rooms or buildings with varying architectures and layouts; outdoor urban spaces; underground spaces; natural settings; and/or other physical environments.

Training anchor content 212 includes images, video, audio, and/or other content that can be combined with training sensor data 210 to produce AR environments (e.g., AR environment 290). Like anchor content 230, training anchor content 212 can be depicted and/or captured in training sensor data 210 (e.g., as a part of the corresponding physical spaces) and/or retrieved separately from training sensor data 210 (e.g., as digital files from a data store).

Ground truth segmentations 208 include labels associated with training sensor data 210 and/or training anchor content 212. For example, ground truth segmentations 208 could include labels representing floors, walls, ceilings, light fixtures, furniture, decorations, doors, windows, and/or other objects that can be found in physical spaces represented by training sensor data 210. These labels could be assigned to regions of pixels, 3D points, meshes, sub-meshes, and/or other data elements within training sensor data 210. In another example, ground truth segmentations 208 could include labels representing foreground, background, textures, objects, shapes, structures, characters, faces, animals, plants, settings, and/or other entities that are found in or represented by training anchor content 212. These labels could be assigned to regions of pixels, audio samples, 3D models, and/or other elements or portions of training anchor content 212. Ground truth segmentations 208 could be available for all sets of training sensor data 210 and/or training anchor content 212 to allow for fully supervised training of one or more components of machine learning model 200, or ground truth segmentations 208 could be available for a subset of training sensor data 210 and/or training anchor content 212 to allow for semi-supervised and/or weakly supervised training of the component(s).

As shown in FIG. 2A, training engine 122 performs a forward pass that inputs training sensor data 210 into space segmentation network 202 and obtains a set of training space segmentations 222 as corresponding output of space segmentation network 202. During the forward pass, training engine 122 also inputs training anchor content 212 into content segmentation network 204 and obtains a set of training content segmentations 224 as corresponding output of content segmentation network 204. Training space segmentations 222 include predictions of classes associated with data elements in training sensor data 210, and training content segmentations 224 include predictions of classes associated with data elements in training anchor content 212. For example, training space segmentations 222 could include predicted probabilities of classes representing floors, walls, ceilings, light fixtures, furniture, decorations, doors, windows, and/or other objects that can be found in physical spaces for regions of pixels, 3D points, and/or other portions of training sensor data 210 representing the physical spaces. Training content segmentations 224 could include predicted probabilities of classes representing foreground, background, textures, objects, shapes, structures, people, characters, faces, body parts, animals, plants, and/or other entities that are found in or represented by various regions or portions of training anchor content 212.

During the forward pass, training engine 122 additionally uses extrapolation network 206 to convert pairs of training space segmentations 222 and training content segmentations 224 into 2D training output 226 representing augmented reality views that combine attributes of physical spaces represented by training sensor data 210 and the corresponding training space segmentations 222 with attributes of training anchor content 212 and the corresponding training content segmentations 224. For example, training engine 122 could input a set of training sensor data 210 for a room, a corresponding training space segmentation generated by space segmentation network 202 from that set of training sensor data 210, a piece of training anchor content 212, and/or a training content segmentation generated by content segmentation network 204 from that piece of training anchor content 212 into extrapolation network 206. In response to the input, extrapolation network 206 could generate a number of images (e.g., images 240) that combine visual and semantic attributes associated with the inputted training sensor data 210 with visual and semantic attributes associated with the inputted training anchor content 212. Each image could represent a different surface of a room with flat walls and/or one or more portions of a panorama view associated with an arbitrarily shaped physical space (e.g., a non-box-shaped room, a contoured space, an outdoor space, etc.).

After the forward pass is complete, training engine 122 computes a number of losses based on training data 214 and output generated by space segmentation network 202, content segmentation network 204, and/or extrapolation network 206. More specifically, training engine 122 computes one or more segmentation losses 218 between training space segmentations 222 generated by space segmentation network 202 from training sensor data 210 and the corresponding ground truth segmentations 208. Training engine 122 also, or instead, computes one or more segmentation losses 218 between training content segmentations 224 generated by content segmentation network 204 from training anchor content 212 and the corresponding ground truth segmentations 208. These segmentation losses 218 can include (but are not limited to) a cross-entropy loss, Dice loss, boundary loss, Tversky loss, and/or another measure of error between a given segmentation generated by space segmentation network 202 and/or content segmentation network 204 and a corresponding ground truth segmentation.

Training engine 122 also, or instead, computes one or more similarity losses 216 between a piece of training anchor content 212 and 2D training output 226 generated by extrapolation network 206 from that piece of training anchor content 212 and a set of training sensor data 210. In some embodiments, similarity losses 216 measure visual similarity between training anchor content 212 and portions of 2D training output 226 that correspond to extensions of training anchor content 212 within a physical space.

For example, training engine 122 could use ground truth segmentations 208 to identify certain regions of a physical space (e.g., one or more walls, ceiling, floor, etc.) across which training anchor content 212 is to be overlaid or extended. These regions could be specified and/or selected to control the way in which the resulting 2D training output 226 is generated. Training engine 122 could apply a mask associated with these regions to 2D training output 226 to remove portions of 2D training output 226 that lie outside these regions. Training engine 122 could compute an L1 loss, L2 loss, mean squared error, Huber loss, and/or other similarity losses 216 as measures of similarity or difference between visual attributes (e.g., shapes, colors, patterns, pixel values, line thicknesses, contours, etc.) of various components of training anchor content 212 and visual attributes of the remaining 2D training output 226. Training engine 122 could also, or instead, convert the remaining 2D training output 226 into a first set of latent representations (e.g., by applying one or more components of extrapolation network 206 and/or a pretrained feature extractor to the remaining 2D training output 226) and compute one or more similarity losses 216 as measures of similarity or difference between the first set of latent representations and a second set of latent representations associated with training anchor content 212 (e.g., latent representations 236 generated by extrapolation network 206 and/or the pretrained feature extractor from training anchor content 212). Consequently, similarity losses 216 can be used to ensure that machine learning model 200 learns to generate extensions of training anchor content 212 into certain portions or regions of physical spaces.

Training engine 122 also, or instead, computes one or more layout losses 220 between 2D training output 226 and ground truth segmentations 208 associated with the corresponding training sensor data 210 and/or training anchor content 212. In one or more embodiments, layout losses 220 measure the extent to which 2D training output 226 depicts a semantically meaningful extension of training anchor content 212 across physical spaces represented by training sensor data 210.

For example, training engine 122 could use ground truth segmentations 208 to identify various objects (e.g., walls, ceiling, floor, furniture, decorations, windows, doors, etc.) in a room represented by a set of training sensor data 210. Training engine 122 could also use ground truth segmentations 208 to generate a mask that identifies regions of objects that should be depicted in 2D training output 226 (e.g., doors, windows, furniture, and/or other objects that should not be occluded by or replaced with training anchor content 212) for that room. These regions could be specified and/or selected to control the way in which the resulting 2D training output 226 is generated. Training engine 122 could apply the mask to 2D training output 226 to remove portions of 2D training output 226 that lie outside those regions. Training engine 122 could then compute an L1 loss, L2 loss, mean squared error, Huber loss, and/or one or more other layout losses 220 as measures of similarity or difference between visual attributes (e.g., shapes, colors, patterns, pixel values, etc.) of the remaining 2D training output 226 and visual attributes of the corresponding objects in training sensor data 210. Training engine 122 could also, or instead, convert the remaining 2D training output 226 into a first set of latent representations (e.g., by applying one or more components of extrapolation network 206 and/or a pretrained feature extractor to the remaining 2D training output 226) and compute one or more layout losses 220 as measures of similarity or difference between the first set of latent representations and a second set of latent representations associated with the corresponding objects in training sensor data 210 (e.g., latent representations 236 generated by extrapolation network 206 and/or a pretrained feature extractor from portions of training sensor data 210 that depict or represent these objects). In other words, layout losses 220 can be used to ensure that 2D training output 226 includes accurate and/or complete depictions of these objects in the corresponding locations, and that any overlays or extensions of training anchor content 212 into an AR view of the room do not occlude these objects.

In one or more embodiments, layout losses 220 are used to ensure semantic and/or spatial consistency across frames of 2D training output 226. For example, 2D training output 226 could include multiple frames that depict extensions of corresponding video frames in training anchor content 212 across physical spaces represented by training sensor data 210. Training engine 122 could provide one or more previous frames in 2D training output 226, the corresponding training space segmentations 222, the corresponding training content segmentations 224, and/or the corresponding frames of training anchor content 212 as additional input to space segmentation network 202, content segmentation network 204, and/or extrapolation network 206 to inform the generation of a current frame of 2D training output 226 from a current frame of training anchor content 212. Training engine 122 could also compute one or more layout losses 220 between or across consecutive frames of 2D training output 226 to ensure that objects or animations within video frames in training anchor content 212 are depicted or extended in substantially the same locations within the physical spaces instead of "bouncing" around or erratically fluctuating.

Training engine 122 then performs a backward pass that updates parameters of space segmentation network 202, content segmentation network 204, and/or extrapolation network 206 using various permutations or combinations of similarity losses 216, segmentation losses 218, and/or layout losses 220. For example, training engine 122 could use a training technique (e.g., gradient descent and backpropagation) to update parameters of space segmentation network 202 based on segmentation losses 218 computed between training space segmentations 222 and the corresponding ground truth segmentations 208. Training engine 122 could also update parameters of content segmentation network 204 based on segmentation losses 218 computed between training content segmentations 224 and the corresponding ground truth segmentations 208. After training of space segmentation network 202 and content segmentation network 204 is complete, training engine 122 could freeze the parameters of space segmentation network 202 and content segmentation network 204 and train extrapolation network 206 based on layout losses 220 and/or similarity losses 216. Training engine 122 could also continue alternating between training space segmentation network 202 and content segmentation network 204 based on segmentation losses 218 and training extrapolation network 206 based on layout losses 220 and/or similarity losses 216 until segmentation losses 218, layout losses 220, and/or similarity losses 216 fall below corresponding thresholds.

In another example, training engine 122 could perform end-to-end training of space segmentation network 202, content segmentation network 204, and extrapolation network 206 using layout losses 220, similarity losses 216, and/or other losses computed based on 2D training output 226. This end-to-end training could be performed after space segmentation network 202 and content segmentation network 204 have been trained based on the corresponding segmentation losses 218, in alternating stages with training of space segmentation network 202 and content segmentation network 204 based on segmentation losses 218, and/or in another fashion.

While the operation of training engine 122 has been described above with respect to certain types of losses, it will be appreciated that space segmentation network 202, content segmentation network 204, and/or extrapolation network 206 can be trained using other types of techniques, losses, and/or machine learning components. For example, training engine 122 could train space segmentation network 202, content segmentation network 204, and/or extrapolation network 206 in an adversarial fashion with one or more discriminator neural networks (not shown) using one or more discriminator losses that are computed based on predictions generated by the discriminator neural network(s) from ground truth segmentations 208, training space segmentations 222, training content segmentations 224, and/or 2D training output 226. In another example, training engine 122 could train space segmentation network 202, content segmentation network 204, and/or extrapolation network 206 using one or more losses that cause 2D training output 226 to reflect "artistic" guidelines or parameters associated with symmetry, balance, color, orientation, scale, style, movement of training anchor content 212 across physical spaces represented by training sensor data 210, the sizes of objects in training anchor content 212 as depicted or placed in physical spaces represented by training sensor data 210, and/or other attributes that affect the way in which training anchor content 212 is depicted or extended across the physical spaces represented by training sensor data 210. In a third example, training engine 122 could train space segmentation network 202, content segmentation network 204, and/or extrapolation network 206 to learn to extend a specific piece of training anchor content 212 across a variety of physical spaces.

After training of machine learning model 200 is complete, execution engine 124 uses one or more components of the trained machine learning model 200 to generate output 2D content 238. In particular, execution engine 124 uses space segmentation network 202 to convert sensor data 228 (e.g., images, point clouds, depth maps, etc.) collected from a physical space into a semantic layout 232 that identifies locations of objects 234 in the physical space. Execution engine 124 also receives anchor content 230 (e.g., an image, painting, video, etc.) as a region of sensor data 228 that is selected by a user and/or one or more images, videos, or audio files that exist separately from sensor data 228. Execution engine 124 uses content segmentation network 204 to convert anchor content 230 into a corresponding content segmentation 294. Execution engine 124 then uses extrapolation network 206 to generate latent representations 236 of objects 234 in layout 232 and/or portions of anchor content 230 identified using content segmentation 294. Execution engine 124 also uses extrapolation network 206 to generate output 2D content 238 based on latent representations 236 (e.g., by sampling, transforming, correlating, or otherwise processing latent representations 236) and/or additional input, such as (but not limited to) the position and orientation of a computing device providing AR environment 290. As mentioned above, output 2D content 238 includes images 240 that depict certain types of objects 234 (e.g., doors, windows, furniture, decorations, etc.) at the respective positions in the physical space, as well as extensions and/or overlays of anchor content 230 across other types of objects 234 (e.g., walls, floor, ceiling, etc.) in the physical space. Images 240 could additionally depict objects 234 from a certain point of view, such as the point of view from which sensor data 228 was collected.

Execution engine 124 additionally incorporates output 2D content 238 into AR environment 290. For example, execution engine 124 could incorporate images 240 into visual, audio, and/or other output generated by an AR system providing AR environment 290, so that AR environment 290 appears to depict a semantically meaningful extension of anchor content 230 across the physical space from the perspective of a user interacting with the AR system. As the user changes the point of view of the AR system and/or updates anchor content 230 (e.g., by "painting" or "drawing" additional portions of anchor content 230; cropping, scaling, and/or otherwise transforming anchor content 230; changing the color balance, saturation, color temperature, exposure, brightness, and/or other color-based attributes of anchor content 230; changing the view of anchor content 230; loading anchor content 230 from a different file; playing a video or animation that includes multiple frames of anchor content 230; etc.), execution engine 124 could receive the updated anchor content 230 and/or additional sensor data 228 that reflects the latest view or representation of the physical space, generate a new layout 232 from the additional sensor data 228 and/or a new content segmentation 294 from the new anchor content 230, and generate new output 2D content 238 that depicts objects 234 and extensions of anchor content 230 associated with the new point of view. Consequently, execution engine 124 generates an immersive AR environment 290 that continuously responds to changes in sensor data 228 and/or anchor content 230.

In some embodiments, output 2D content 238 is used in other types of immersive environments, such as (but not limited to) a virtual reality (VR) and/or mixed reality (MR) environment. This content can depict virtual worlds that can be experienced by any number of users synchronously and persistently, while providing continuity of data such as (but not limited to) personal identity, user history, entitlements, possession, and/or payments. It is noted that this content can include a hybrid of traditional audiovisual content and fully immersive VR, AR, and/or MR experiences, such as interactive video.

Figure 2B:
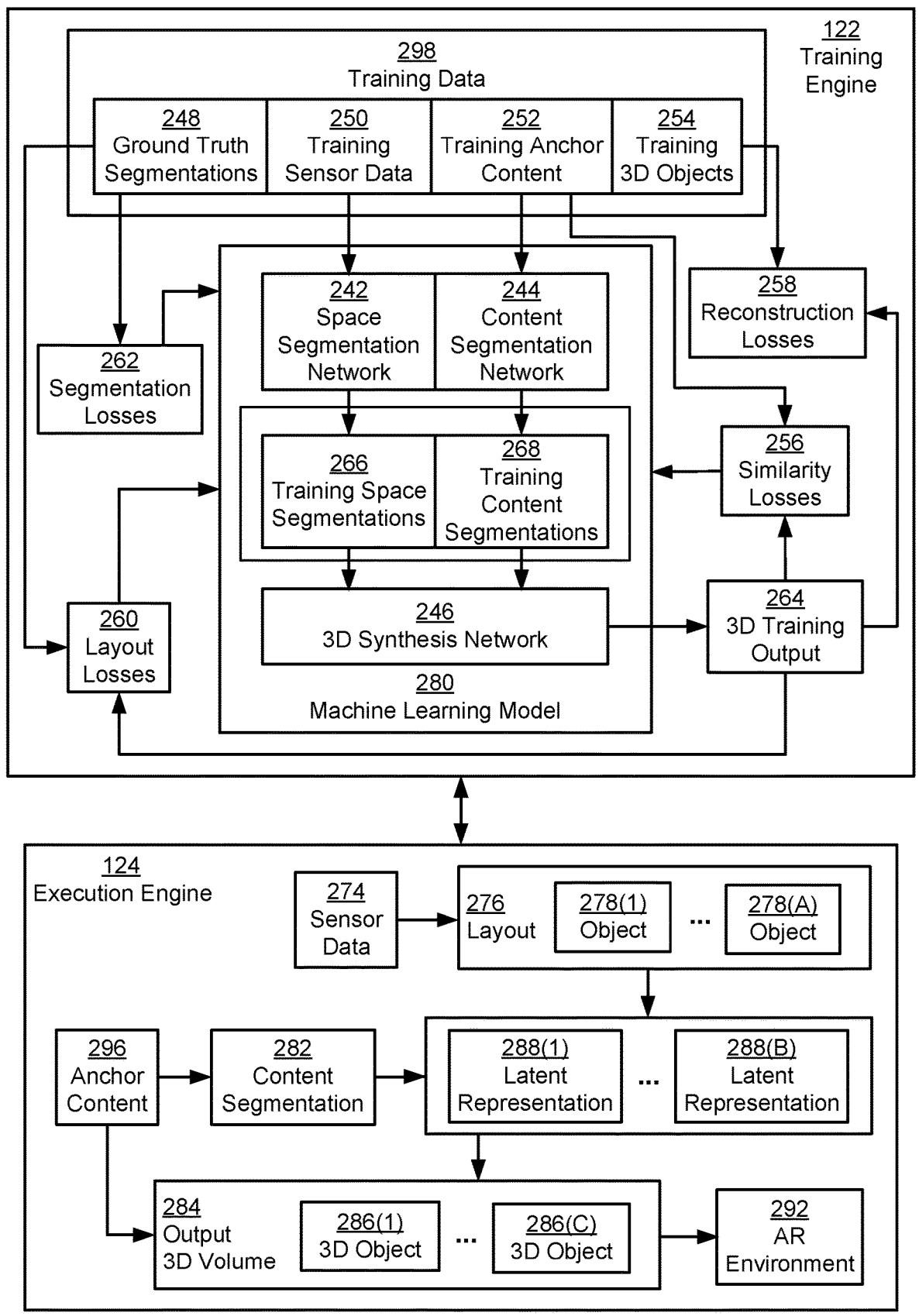
FIG. 2B is a more detailed illustration of the training engine and execution engine of FIG. 1, according to various embodiments.

FIG. 2B is a more detailed illustration of training engine 122 and execution engine 124 of FIG. 1, according to various embodiments. More specifically, FIG. 2B illustrates the operation of training engine 122 and execution engine 124 in using a machine learning model 280 to generate an AR environment 292 that includes an output 3D volume 284. Within output 3D volume 284, 3D objects 286(1)-286(C) (each of which is referred to individually as 3D object 286) derived from a set of anchor content 296 are placed within a layout 276 of a physical space in a semantically meaningful manner.

As with anchor content 230 of FIG. 2A, a given set of anchor content 296 includes one or more pieces of any type of media that can be incorporated into AR environment 292. For example, anchor content 296 could include an image, series of images, video, audio, text, and/or another type of digital content that can be overlaid and/or combined with a "real world" setting into AR environment 292. In another example, anchor content 296 could include one or more 3D animations, 3D models, and/or other types of 3D content that can be used with AR environment 292.

In one or more embodiments, anchor content 296 is outputted and/or captured within the physical space that is incorporated into AR environment 292. For example, anchor content 296 could include a photograph, painting, and/or 2D or 3D video that is outputted by a television, projector, display, and/or another visual output device in a room. In another example, anchor content 296 could include a painting, photograph, mural, sculpture, sound, and/or another physical entity that is present in or detected from the room. Anchor content 296 can be specified by a user interacting with AR environment 292 using a bounding box or bounding shape, via a calibration process that involves displaying a known image on an output device prior to displaying anchor content 230, and/or via another method.

Anchor content 296 can also, or instead, exist separately from the physical space into which anchor content 296 is to be placed. For example, anchor content 296 could be specified as a file that includes an image, video, audio, text, 3D model, and/or another type of content that can be retrieved from a data store and incorporated into AR environment 292. In another example, a user interacting with AR environment 292 could generate and/or update anchor content 296 via one or more cropping, scaling, rotation, translation, color adjustment, and/or painting operations.

Machine learning model 280 includes a space segmentation network 242, a content segmentation network 244, and a 3D synthesis network 246. In some embodiments, space segmentation network 242, content segmentation network 244, and 3D synthesis network 246 are implemented as neural networks and/or other types of machine learning models. For example, space segmentation network 242, content segmentation network 244, and 3D synthesis network 246 could include, but are not limited to, one or more convolutional neural networks, fully connected neural networks, recurrent neural networks, residual neural networks, transformer neural networks, autoencoders, variational autoencoders, generative adversarial networks, autoregressive models, bidirectional attention models, mixture models, diffusion models, neural radiance field models, and/or other types of machine learning models that can process and/or generate content.

In some embodiments, machine learning model 280 generates output 3D volume 284 based on anchor content 296 and layout 276. In some embodiments, layout 276 includes 3D positions, orientations, and/or representations of objects 278(1)-278(A) (each of which is referred to individually as object 278) in a physical space. For example, layout 276 could include one or more meshes, point clouds, textures, and/or other 3D representations of a room, as captured by one or more cameras, depth sensors, and/or other types of sensors. Various portions or subsets of the 3D representations could additionally be segmented or labeled to denote objects such as wall, floor, ceiling, door, table, chair, rug, window, and/or other objects in the room.

In one or more embodiments, layout 276 is generated by space segmentation network 242 based on sensor data 274 associated with the physical space. For example, sensor data 274 could include images, depth maps, point clouds, meshes, textures, and/or other 3D representations of the physical space. Sensor data 274 could be collected by sensors on an augmented reality device and/or another type of computing device within and/or in proximity to the physical space. Sensor data 274 could also be used to generate a 3D model corresponding to a "virtual twin" of the physical space. Sensor data 274 and/or the virtual twin could be inputted into space segmentation network 242, and predictions of objects and/or categories of objects for individual elements (e.g., pixel locations, points in a point cloud, etc.), locations, or regions in the data could be obtained as corresponding output of space segmentation network 242.

In some embodiments, anchor content 296 is similarly processed by content segmentation network 244 to generate a content segmentation 282. For example, one or more images in anchor content 296 could be inputted into content segmentation network 244, and content segmentation 282 could be obtained as predictions of objects and/or categories of objects (e.g., foreground, background, clouds, stars, objects, animals, faces, structures, shapes, etc.) generated by content segmentation network 244 for individual pixel locations and/or other data elements in the image(s).

As mentioned above, anchor content 296 can also include individual 3D objects 286 and/or other distinct components that can be individually placed or incorporated within output 3D volume 284. For example, anchor content 296 could include separate 3D models for different "virtual" characters, faces, trees, buildings, furniture, clouds, stars, and/or other objects. In this example, content segmentation 282 could be omitted, or content segmentation 282 could be performed on each 3D model to further identify sub-components of the corresponding object or entity (e.g., wheels, windows, chassis, doors, and/or other parts of a 3D model for a car).

Anchor content 296, sensor data 274, layout 276, and/or content segmentation 282 are provided as input into 3D synthesis network 246. In response to the input, 3D synthesis network 246 generates latent representations 288(1)-288(B) (each of which is referred to individually as latent representation 288) of various portions of the inputted data. 3D synthesis network 246 also converts latent representations 288 into output 3D volume 284.

In some embodiments, output 3D volume 284 includes a 3D representation of the physical space associated with sensor data 274. Within the 3D representation, 3D objects 286 derived from anchor content 296 are placed within the physical space in a semantically meaningful manner. For example, output 3D volume 284 could be represented by a neural radiance field generated by 3D synthesis network 246. The neural radiance field could include 3D representations of real-world objects 278 from the physical space, such as (but not limited to) doors, windows, furniture, and/or decorations. The neural radiance field could also include 3D objects 286 corresponding to various components of anchor content 296 (as identified in content segmentation 282). These components of anchor content 296 could additionally be positioned or distributed within output 3D volume 284 to avoid occluding and/or overlapping with doors, windows, furniture, decorations, and/or other real-world objects in the room. These components of anchor content 296 could also, or instead, be placed and/or "animated" in a way that interacts with real-world objects in the room.

Training engine 122 trains machine learning model 280 using training data 298 that includes a set of ground truth segmentations 248, a set of training sensor data 250, a set of training anchor content 252, and/or a set of training 3D objects 254. Training sensor data 250 includes images, point clouds, and/or other digital representations of the visual and/or spatial attributes of rooms, buildings, urban settings, natural settings, underground settings, and/or other types of physical spaces. Training sensor data 250 also, or instead, includes "digital twins" of physical spaces that are constructed using images, point clouds, meshes, textures, and/or other visual or spatial attributes of the physical spaces.

Training anchor content 252 includes images, video, audio, and/or other content that can be combined with training sensor data 250 to produce AR environments (e.g., AR environment 292). Like anchor content 296, training anchor content 252 can be depicted and/or captured in training sensor data 250 (e.g., as a part of the corresponding physical spaces) and/or retrieved separately from training sensor data 250 (e.g., as digital files from a data store).

Ground truth segmentations 248 include labels associated with training sensor data 250 and/or training anchor content 252. For example, ground truth segmentations 248 could include labels representing floors, walls, ceilings, light fixtures, furniture, decorations, doors, windows, and/or other objects that can be found in physical spaces represented by training sensor data 250. These labels could be assigned to regions of pixels, 3D points, meshes, sub-meshes, and/or other data elements within training sensor data 250. In another example, ground truth segmentations 248 could include labels representing foreground, background, textures, objects, shapes, structures, people, characters, faces, body parts, animals, plants, and/or other entities that are found in or represented by training anchor content 252. These labels could be assigned to regions of pixels, point clouds, meshes, sub-meshes, audio tracks or channels, and/or other elements or portions of training anchor content 252. Ground truth segmentations 248 could be available for all sets of training sensor data 250 and/or training anchor content 252 to allow for fully supervised training of one or more components of machine learning model 280, or ground truth segmentations 248 could be available for a subset of training sensor data 250 and/or training anchor content 252 to allow for semi-supervised and/or weakly supervised training of the component(s).

Training 3D objects 254 include 3D representations of training anchor content 252. For example, training anchor content 252 could include images or videos that depict 2D renderings of 3D models or scenes, and training 3D objects 254 could include the 3D models or scenes. In other words, training 3D objects 254 can be used as "ground truth" 3D representations of objects in training anchor content 252.

In some embodiments, some or all training 3D objects 254 are included in training anchor content 252. For example, training 3D objects 254 could be inputted into one or more components of machine learning model 280 to allow machine learning model 280 to learn to place training 3D objects 254 within 3D representations of physical spaces in a semantically meaningful fashion.

As shown in FIG. 2B, training engine 122 performs a forward pass that inputs training sensor data 250 into space segmentation network 242 and obtains a set of training space segmentations 266 as corresponding output of space segmentation network 242. During the forward pass, training engine 122 also inputs training anchor content 252 into content segmentation network 244 and obtains a set of training content segmentations 268 as corresponding output of content segmentation network 244. Training space segmentations 266 include predictions of classes associated with data elements in training sensor data 250, and training content segmentations 268 include predictions of classes associated with various subsets or portions of training anchor content 252. For example, training space segmentations 266 could include predicted probabilities of classes representing floors, walls, ceilings, light fixtures, furniture, decorations, doors, windows, and/or other objects that can be found in physical spaces for regions of pixels, 3D points, and/or other types of training sensor data 250 representing the physical spaces. Training content segmentations 268 could include predicted probabilities of classes representing foreground, background, textures, objects, shapes, structures, people, characters, faces, animals, plants, and/or other entities that are found in or represented by training anchor content 252 for various regions or portions of training anchor content 252.

During the forward pass, training engine 122 additionally uses 3D synthesis network 246 to convert pairs of training space segmentations 266 and training content segmentations 268 into 3D training output 264 representing 3D scenes that combine attributes of physical spaces represented by training sensor data 250 and the corresponding training space segmentations 266 with attributes of training anchor content 252 and the corresponding training content segmentations 268. For example, training engine 122 could input a set of training sensor data 250 for a physical space, a corresponding training space segmentation generated by space segmentation network 242 from that set of training sensor data 250, a set of training anchor content 252, and/or a training content segmentation generated by content segmentation network 244 from that set of training anchor content 252 into 3D synthesis network 246. In response to the input, 3D synthesis network 246 could generate 3D training output 264 that includes a neural radiance field and/or another representation of a 3D scene volume. The 3D scene volume could combine visual and semantic attributes associated with the inputted training sensor data 250 with visual and semantic attributes associated with the inputted training anchor content 252.

In one or more embodiments, 3D synthesis network 246 generates 3D training output 264 in multiple stages. For example, 3D synthesis network 246 could include a first set of neural network layers that convert 2D training anchor content 252 into 3D representations of the same objects, given the 2D training anchor content 252 and corresponding training content segmentations 268. 3D synthesis network 246 could also include a second set of neural network layers that place the 3D representations within a 3D model of a physical space represented by a set of training sensor data 250, given input that includes the 3D representations, the set of training sensor data 250, and/or training space segmentations 266 generated from the set of training sensor data 250. If training anchor content 252 includes 3D representations of objects, these 3D representations could be inputted directly into the second set of neural network layers instead of requiring additional processing by the first set of neural network layers.

After the forward pass is complete, training engine 122 computes a number of losses based on training data 298 and output generated by space segmentation network 242, content segmentation network 244, and/or 3D synthesis network 246. More specifically, training engine 122 computes one or more segmentation losses 262 between training space segmentations 266 generated by space segmentation network 242 from training sensor data 250 and the corresponding ground truth segmentations 248. Training engine 122 also, or instead, computes one or more segmentation losses 262 between training content segmentations 268 generated by content segmentation network 244 from training anchor content 252 and the corresponding ground truth segmentations 248. These segmentation losses 262 can include (but are not limited to) a cross-entropy loss, Dice loss, boundary loss, Tversky loss, and/or another measure of error between a given segmentation generated by space segmentation network 242 and/or content segmentation network 244 and a corresponding ground truth segmentation.

Training engine 122 also, or instead, computes one or more similarity losses 256 between a piece of training anchor content 252 and a corresponding view associated with 3D training output 264 generated by extrapolation network 206 from that piece of training anchor content 252 and a set of training sensor data 250. In some embodiments, similarity losses 256 measure visual similarity between training anchor content 252 and rendered views of 3D training output 264 that is generated based on training anchor content 252. For example, training engine 122 could use ground truth segmentations 248 to identify certain regions of a physical space (e.g., one or more walls, ceiling, floor, etc.) across which training anchor content 252 is to be placed or shown. These regions could be specified and/or selected to control the way in which the resulting 3D training output 264 is generated. Training engine 122 could apply a mask associated with these regions to 3D training output 264 to remove portions of 3D training output 264 that lie outside these regions. Training engine 122 could then compute an L1 loss, L2 loss, mean squared error, Huber loss, and/or other similarity losses 256 as measures of similarity or difference between visual attributes (e.g., shapes, colors, patterns, pixel values, etc.) of various components of training anchor content 252 and visual attributes of the rendered views of 3D training output 264. Training engine 122 could also, or instead, convert the remaining 3D training output 264 and/or rendered views into a first set of latent representations (e.g., by applying one or more components of 3D synthesis network 246 and/or a pretrained feature extractor to the remaining 3D training output 264) and compute one or more similarity losses 256 as measures of similarity or difference between the first set of latent representations and a second set of latent representations associated with training anchor content 252 (e.g., latent representations 288 generated by 3D synthesis network 246 and/or the pretrained feature extractor from training anchor content 252).

Training engine 122 also, or instead, computes one or more layout losses 260 based on 3D training output 264 and ground truth segmentations 248 associated with the corresponding training sensor data 250 and/or training anchor content 252. In one or more embodiments, layout losses 260 measure the extent to which 3D training output 264 depicts a semantically meaningful placement of training anchor content 252 within physical spaces represented by training sensor data 250.

For example, training engine 122 could use ground truth segmentations 248 to identify various objects (e.g., walls, ceiling, floor, furniture, decorations, windows, doors, etc.) in a room represented by a set of training sensor data 250. Training engine 122 could generate a mask that identifies regions of objects that should be depicted in 3D training output 264 (e.g., doors, door frames, windows, window frames, furniture, decorations, boundaries of objects, and/or other areas that should not be obscured by placements of training anchor content 252) for that room. These regions could be specified and/or selected to control the way in which the resulting 3D training output 264 is generated. Training engine 122 could apply the mask to 3D training output 264 to remove portions of 3D training output 264 that lie outside those regions. Training engine 122 could then compute an L1 loss, L2 loss, mean squared error, Huber loss, and/or one or more other layout losses 260 as measures of similarity or difference between visual attributes (e.g., shapes, colors, patterns, pixel values, etc.) of the remaining 3D training output 264 (or rendered views of the remaining 3D training output 264) and visual attributes of the corresponding objects in training sensor data 250. Training engine 122 could also, or instead, convert the remaining 3D training output 264 (or rendered views of the remaining 3D training output 364) into a first set of latent representations (e.g., by applying one or more components of 3D synthesis network 246 and/or a pretrained feature extractor to the remaining 3D training output 264) and compute one or more layout losses 260 as measures of similarity or difference between the first set of latent representations and a second set of latent representations associated with the corresponding objects in training sensor data 210 (e.g., latent representations 288 generated by 3D synthesis network 246 and/or a pretrained feature extractor from portions of training sensor data 250 that depict or represent these objects). Consequently, layout losses 260 could be used to ensure that 3D training output 264 includes accurate and/or complete depictions of these objects in the corresponding locations, and that any overlays or placements of training anchor content 252 into a 3D volume representing the room do not occlude or distort these objects.

In some embodiments, one or more layout losses 260 are used to ensure that training anchor content 252 is placed in certain locations within the physical space represented by a given set of training sensor data 250. These locations can include (but are not limited to) unadorned surfaces such as walls or floors, "empty" volumes of more than a threshold size (e.g., an unoccupied portion of a room that exceeds a certain volume or set of dimensions), surfaces on which objects can be placed (e.g., tables, desks, fireplaces, etc.), and/or certain types of objects that can be "embellished" with training anchor content 252 (e.g., light fixtures, windows, or doorways through which training anchor content 252 could "flow," textures or surfaces that can be combined with corresponding elements of training anchor content 252 to form patterns or animations, etc.). To train machine learning model 280 to place various types of training anchor content 252 at these locations, training engine 122 can generate a mask that identifies these areas or locations and apply the mask to 3D training output 264 to remove portions of 3D training output 264 that lie outside these areas or locations. Training engine 122 can also compute an L1 loss, L2 loss, mean squared error, Huber loss, and/or one or more other layout losses 260 as measures of similarity or difference between visual attributes of the remaining 3D training output 264 (or rendered views of the remaining 3D output) and visual attributes of training anchor content 252 to be placed in the corresponding areas or locations.

In other words, layout losses 260 can be defined in a way that causes machine learning model 280 to generate 3D training output 264 that includes certain types of training anchor content 252 placed in certain parts of a physical space represented by a set of training sensor data 250 and/or a virtual twin generated from the set of training sensor data 250. For example, layout losses 260 could be defined in a way that causes machine learning model 280 to generate 3D training output 264 that includes utensils, dishes, glassware, clocks, characters, animals, and/or other discrete objects in training anchor content 252 (as identified by training content segmentations 268 and/or ground truth segmentations 248) placed on tables, coffee tables, desks, fireplaces, rugs, floors, and/or other objects with horizontal surfaces (as identified by training space segmentations 266 and/or ground truth segmentations 248). In another example, layout losses 260 could be defined in a way that causes machine learning model 280 to generate 3D training output 264 that includes clouds, rain, stars, rays of light, vines, or other celestial or "hanging" objects in training anchor content 252 (as identified by training content segmentations 268 and/or ground truth segmentations 248) along or near the ceiling or top of a room (as identified by training space segmentations 266 and/or ground truth segmentations 248). In a third example, layout losses 260 could be defined in a way that causes machine learning model 280 to generate 3D training output 264 that includes a river or waterfall in training anchor content 252 (as identified by training content segmentations 268 and/or ground truth segmentations 248) flowing through "empty" or unadorned space (as identified by training space segmentations 266 and/or ground truth segmentations 248).

In one or more embodiments, layout losses 260 are used to ensure semantic and/or spatial consistency across time steps associated with 3D training output 264. For example, 3D training output 264 could include a sequence of 3D volumes that depict placements of objects from corresponding video frames or time steps in training anchor content 252 in physical spaces represented by training sensor data 210. Training engine 122 could provide one or more previous frames in 3D training output 264, the corresponding training space segmentations 266, the corresponding training content segmentations 268, and/or the corresponding frames or time steps in training anchor content 252 as additional input to space segmentation network 242, content segmentation network 244, and/or 3D synthesis network 246 to inform the generation of a current frame of 3D training output 264 from a current frame of training anchor content 252. Training engine 122 could also compute one or more layout losses 260 between or across consecutive 3D volumes in 3D training output 264 to ensure that objects or animations within consecutive frames or time steps in training anchor content 252 are placed in substantially the same locations within the physical spaces instead of "bouncing" around or erratically fluctuating.

Training engine 122 also, or instead, computes one or more reconstruction losses 258 between 3D representations of training anchor content 252 outputted by synthesis network 246 and the corresponding training 3D objects 254. For example, training engine 122 could compute one or more reconstruction losses 258 between 3D models in training 3D objects 254 and 3D representations generated by 3D synthesis network 246 from the corresponding parts of 2D training anchor content 252. Reconstruction losses 258 thus allow machine learning model 280 to learn to convert depictions of 2D objects in training anchor content 252 into the corresponding training 3D objects 254.

After similarity losses 256, reconstruction losses 258, layout losses 260, and/or segmentation losses 262 are computed for a given forward pass, training engine 122 performs a backward pass that updates parameters of space segmentation network 242, content segmentation network 244, and/or 3D synthesis network 246 using various permutations or combinations of similarity losses 256, reconstruction losses 258, layout losses 260, and/or segmentation losses 262. For example, training engine 122 could use a training technique (e.g., gradient descent and backpropagation) to update parameters of space segmentation network 242 based on segmentation losses 262 computed between training space segmentations 266 and the corresponding ground truth segmentations 248. Training engine 122 could also update parameters of content segmentation network 244 based on segmentation losses 262 computed between training content segmentations 268 and the corresponding ground truth segmentations 248. After training of space segmentation network 242 and content segmentation network 244 is complete, training engine 122 could freeze the parameters of space segmentation network 242 and content segmentation network 244 and train 3D synthesis network 246 based on layout losses 260, similarity losses 256, and/or reconstruction losses 258. Training engine 122 could also continue alternating between training space segmentation network 242 and content segmentation network 244 based on segmentation losses 262 and training 3D synthesis network 246 based on layout losses 260, similarity losses 256, and/or reconstruction losses 258 until segmentation losses 2262, layout losses 260, similarity losses 256, and/or reconstruction losses 258 fall below corresponding thresholds.

In another example, training engine 122 could perform end-to-end training of space segmentation network 242, content segmentation network 244, and 3D synthesis network 246 using layout losses 260, similarity losses 256, reconstruction losses 258, and/or other losses computed based on 3D training output 264. This end-to-end training could be performed after space segmentation network 242 and content segmentation network 244 have been trained based on the corresponding segmentation losses 262, in alternating stages with training of space segmentation network 242 and content segmentation network 244 based on segmentation losses 262, and/or in another fashion.

While the operation of training engine 122 has been described above with respect to certain types of losses, it will be appreciated that space segmentation network 242, content segmentation network 244, and/or 3D synthesis network 246 can be trained using other types of techniques, losses, and/or machine learning components. For example, training engine 122 could train space segmentation network 242, content segmentation network 244, and/or 3D synthesis network 246 in an adversarial fashion with one or more discriminator neural networks (not shown) using one or more discriminator losses that are computed based on predictions generated by the discriminator neural network(s) from ground truth segmentations 248, training space segmentations 266, training content segmentations 268, and/or 3D training output 264. In another example, training engine 122 could train space segmentation network 242, content segmentation network 244, and/or 3D synthesis network 246 using one or more losses that cause 3D training output 264 to reflect "artistic" guidelines or parameters associated with symmetry, balance, color, orientation, scale, style, movement of training anchor content 252 across physical spaces represented by training sensor data 250, the sizes of objects in training anchor content 252 as depicted or placed in physical spaces represented by training sensor data 250, and/or other attributes that affect the way in which training anchor content 252 is depicted or placed in the physical spaces represented by training sensor data 250. In a third example, training engine 122 could train space segmentation network 242, content segmentation network 244, and/or 3D synthesis network 246 to learn to extend a specific piece of 2D or 3D training anchor content 252 across a variety of physical spaces.

After training of machine learning model 280 is complete, execution engine 124 uses one or more components of the trained machine learning model 280 to generate output 3D volume 284. In particular, execution engine 124 uses space segmentation network 242 to convert sensor data 274 (e.g., images, point clouds, meshes, depth maps, etc.) collected from a physical space into a semantic layout 276 that identifies locations, shapes, and orientations of objects 278 in the physical space. Execution engine 124 also uses content segmentation network 244 to convert a given piece of anchor content 296 (e.g., an image, painting, video, etc.) that is captured in sensor data 274 or provided separately from sensor data 274 into a corresponding content segmentation 282. Execution engine 124 then uses 3D synthesis network 246 to generate latent representations 288 of objects 278 in layout 276 and/or portions of anchor content 296 identified using content segmentation 282. Execution engine 124 also uses 3D synthesis network 246 to generate output 3D volume 284 based on latent representations 288 (e.g., by sampling, transforming, correlating, or otherwise processing latent representations 288). As mentioned above, output 3D volume 284 includes one set of 3D objects 286 (e.g., doors, windows, furniture, decorations, etc.) from the physical space in the respective positions and a second set of 3D objects 286 that correspond to 3D representations of various portions of anchor content 296 placed within the physical space.

Execution engine 124 additionally incorporates various views of output 3D volume 284 into AR environment 292. For example, execution engine 124 could estimate and/or determine the perspective associated with an AR system providing AR environment 292 based on images of the physical space captured by the AR system, inertial sensor data from the AR system, a position and orientation of a computing device corresponding to the AR system, and/or other sensor data 228 associated with or captured by the AR system. Execution engine 124 could use machine learning model 280 to render a view of output 3D volume 284 from the perspective of an AR system providing AR environment 292. As a result, AR environment 290 could depict a semantically meaningful placement of 3D representations of anchor content 296 across the physical space from the perspective of a user interacting with the AR system. As the user changes the point of view of the AR system and/or updates anchor content 296 (e.g., by "drawing" or "painting" additional portions of anchor content 296; cropping, scaling, and/or otherwise transforming anchor content 296;

changing the color balance, saturation, color temperature, exposure, brightness, and/or other color-based attributes of anchor content 296; changing the view of anchor content 296; loading anchor content 296 from a different file; playing a video or animation that includes multiple frames of anchor content 296; etc.), execution engine 124 could receive the updated anchor content 296 and/or updated sensor data 274 that reflects the latest view or representation of the physical space, generate a new layout 276 from the additional sensor data 274 and/or a new content segmentation 282 from the new anchor content 296, generate a new output 3D volume 284 that depicts 3D objects 286 associated with the new anchor content 296, and render the new output 3D volume from the latest view. Consequently, execution engine 124 generates an immersive AR environment 292 that continuously responds to changes in sensor data 274 and/or anchor content 296.

In some embodiments, output 3D volume 284 is used in other types of immersive environments, such as (but not limited to) a virtual reality (VR) and/or mixed reality (MR) environment. This content can depict virtual worlds that can be experienced by any number of users synchronously and persistently, while providing continuity of data such as (but not limited to) personal identity, user history, entitlements, possession, and/or payments. It is noted that this content can include a hybrid of traditional audiovisual content and fully immersive VR, AR, and/or MR experiences, such as interactive video.

Figure 3A:
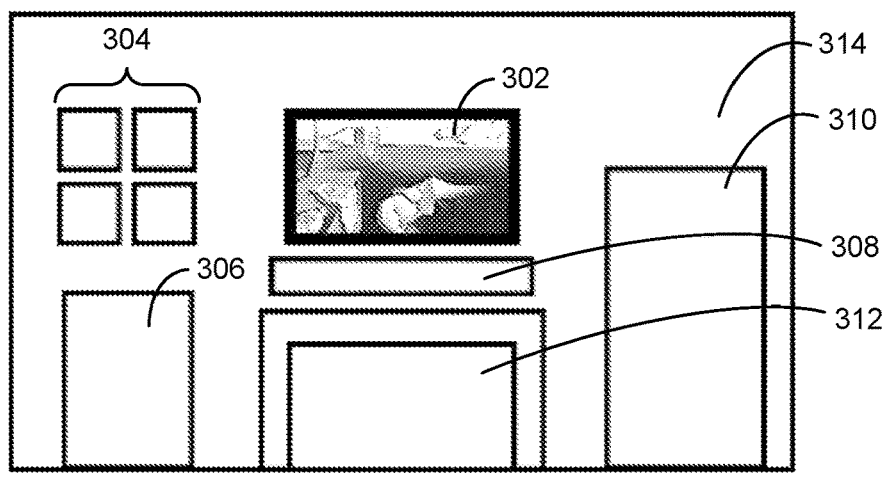
FIG. 3A illustrates an example layout of a physical space, according to various embodiments.

FIG. 3A illustrates an example layout of a physical space, according to various embodiments. As shown in FIG. 3A, the example layout includes an object 302 that depicts a piece of anchor content. For example, object 302 could include a painting that is mounted on a wall and/or an image or video that is displayed on a monitor or television.

The layout of FIG. 3A also includes a number of additional objects 304, 306, 308, 310, 312, and 314 arranged around the physical space. For example, objects 304 could include a set of picture frames, object 306 could include a bookshelf, object 308 could include a speaker system or soundbar, object 310 could include a door, object 312 could include a fireplace, and object 314 could include a wall.

Figure 3B:
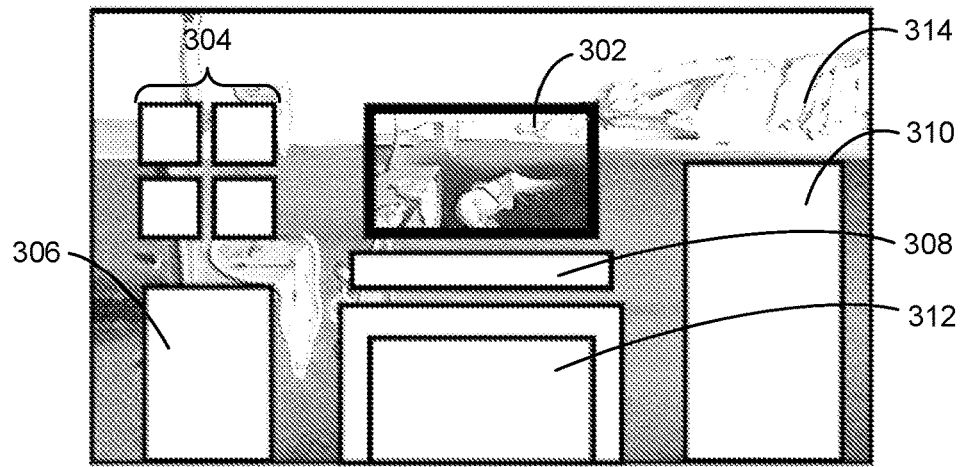
FIG. 3B illustrates an example of an augmented reality (AR) environment that extends two-dimensional (2D) anchor content into the physical space of FIG. 3A, according to various embodiments.

FIG. 3B illustrates an example of an AR environment that extends 2D anchor content into the physical space of FIG. 3A, according to various embodiments. More specifically, FIG. 3B illustrates an AR environment that extends anchor content depicted in object 302 across the wall corresponding to object 314. As shown in FIG. 3B, the extended anchor content does not obscure certain "real-world" objects 302, 304, 306, 308, 310, 312 in the physical space. Instead, the anchor content is shown on "unadorned" portions of the wall, and objects 302, 304, 306, 308, 310, 312, and 314 are shown in their respective positions in the physical space. Consequently, the anchor content is blended with the layout of the physical space in a semantically meaningful fashion.

Figure 3C:
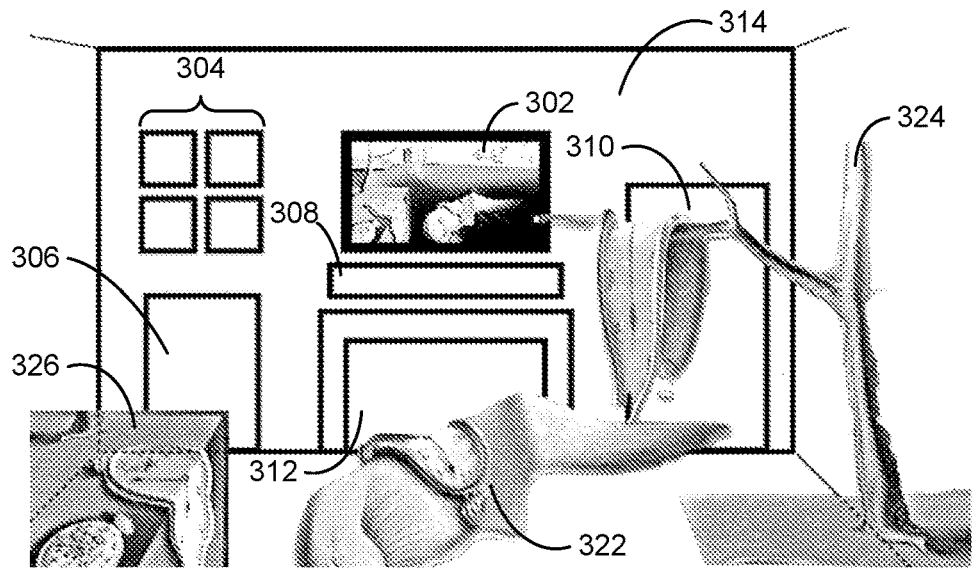
FIG. 3C illustrates an example of an AR environment that includes a view of a three-dimensional (3D) volume associated with the physical space of FIG. 3A, according to various embodiments.

FIG. 3C illustrates an example of an AR environment that includes a view of a 3D volume associated with the physical space of FIG. 3A, according to various embodiments. In particular, FIG. 3C illustrates an AR environment that includes a view of a 3D volume. The 3D volume includes 3D representations of the anchor content depicted in object 302 placed in various locations within the physical space.

More specifically, the 3D volume includes multiple 3D objects 322, 324, and 326 that are generated from different portions of the anchor content. Each 3D object 322, 324, and 326 is placed in an "empty" part of the physical space within the 3D volume. The 3D volume also includes objects 302, 304, 306, 308, 310, 312, and 314 from the layout of FIG. 3A.

The 3D volume can additionally be used to render 3D objects 322, 324, and 326 generated from the anchor content and objects 302, 304, 306, 308, 310, 312, and 314 from different views. For example, a user could walk around the physical space with an computing device providing the AR environment to view 3D objects 322, 324, and 326 and/or objects 302, 304, 306, 308, 310, 312, and 314 from different angles; view 3D objects 322, 324, and 326 and/or objects 302, 304, 306, 308, 310, 312, and 314 at varying levels of detail; change the position, size, color, and/or another attribute of a given 3D object 322, 324, and 326 and/or a given real-world object 302, 304, 306, 308, 310, 312, and 314; and/or otherwise interact with the AR environment.

Figure 4A:
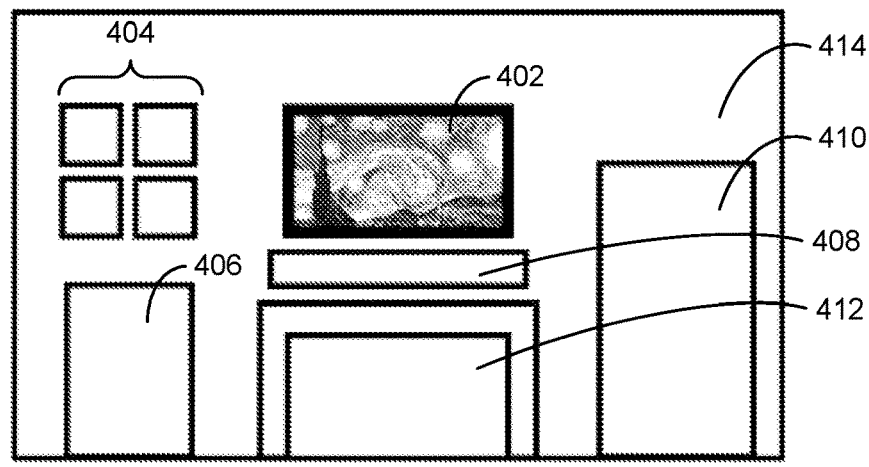
FIG. 4A illustrates an example layout of a physical space, according to various embodiments.

FIG. 4A illustrates an example layout of a physical space, according to various embodiments. As with the layout of FIG. 3A, the example layout of FIG. 4A includes an object 402 that depicts a piece of anchor content. For example, object 402 could include a painting that is mounted on a wall and/or an image that is displayed on a monitor or television.

The layout of FIG. 4A also includes a number of additional objects 404, 406, 408, 410, 412, and 414 arranged around the physical space. For example, objects 404 could include a set of picture frames, object 406 could include a bookshelf, object 408 could include a speaker system or soundbar, object 410 could include a door, object 412 could include a fireplace, and object 414 could include a wall.

Figure 4B:
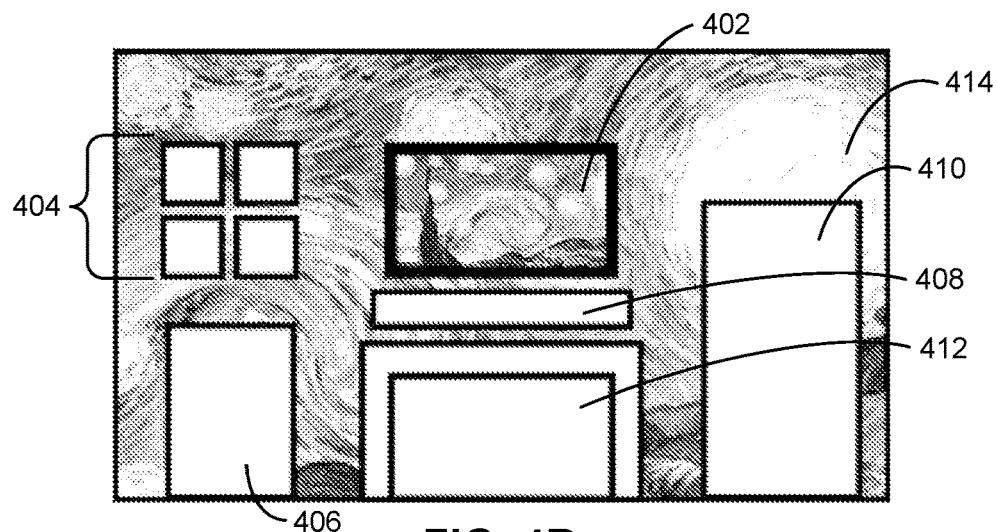
FIG. 4B illustrates an example of an AR environment that extends 2D anchor content into the physical space of FIG. 4A, according to various embodiments.

FIG. 4B illustrates an example of an AR environment that extends 2D anchor content into the physical space of FIG. 4A, according to various embodiments. More specifically, FIG. 4B illustrates an AR environment that extends anchor content depicted in object 402 across the wall corresponding to object 414. As shown in FIG. 4B, the extended anchor content does not obscure existing "real-world" objects 402, 404, 406, 408, 410, 412, and 414 in the physical space. Instead, the anchor content is shown on "unadorned" portions of the wall, and objects 402, 404, 406, 408, 410, 412, and 414 are shown in their respective positions in the physical space. Consequently, the anchor content is blended with the layout of the physical space in a semantically meaningful fashion.

Figure 4C:
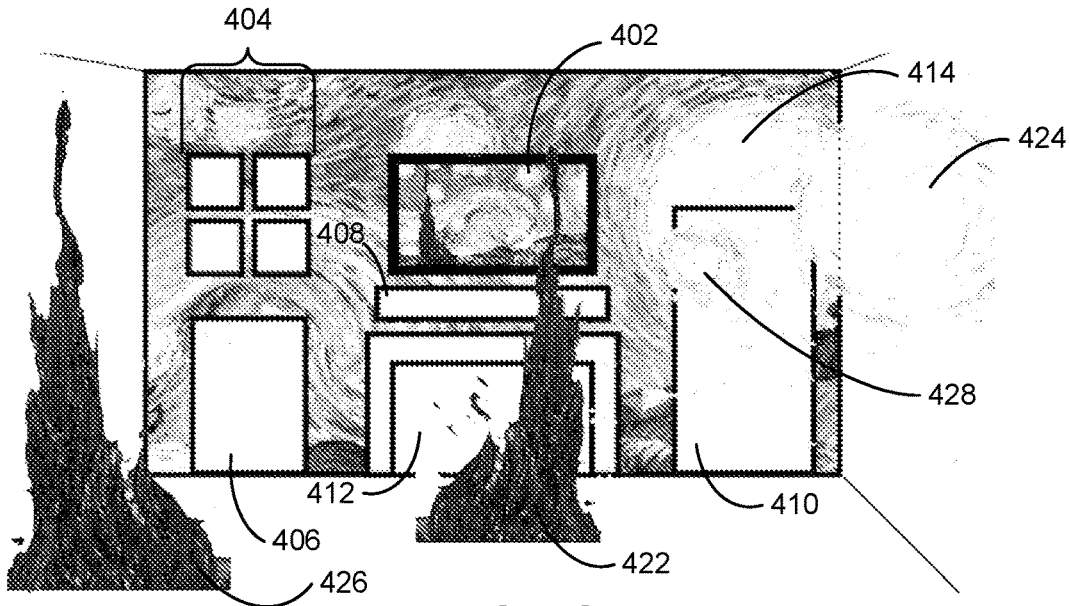
FIG. 4C illustrates an example of an AR environment that includes a view of a 3D volume associated with the physical space of FIG. 4A, according to various embodiments.

FIG. 4C illustrates an example of an AR environment that includes a view of a 3D volume associated with the physical space of FIG. 4A, according to various embodiments. In particular, FIG. 4C illustrates an AR environment that includes a view of a 3D volume. The 3D volume includes 3D representations of the anchor content depicted in object 402 placed in various locations within the physical space.

More specifically, the 3D volume includes multiple 3D objects 422, 424, 426, and 428 that are generated from different portions of the anchor content. Each 3D object 422, 424, 426, and 428 is placed in an "empty" part of the physical space within the 3D volume. The 3D volume also includes a 2D extension of the anchor content across the wall corresponding to object 414.

The 3D volume can additionally be used to render 3D objects 422, 424, 426, and 428 generated from the anchor content and objects 402, 404, 406, 408, 410, 412, and 414 from different views. For example, a user could walk around the physical space with an AR device providing the AR environment to view 3D objects 422, 424, 426, and 428 and/or objects 402, 404, 406, 408, 410, 412, and 414 from different angles; view 3D objects 422, 424, 426, and 428 and/or objects 402, 404, 406, 408, 410, 412, and 414 at varying levels of detail; change the position, size, color, and/or another attribute of a given 3D objects 422, 424, 426, and 428 and/or a given real-world object 402, 404, 406, 408, 410, 412, and 414; and/or otherwise interact with the AR environment.

While the example AR environments of FIGS. 3B, 3C, 4B, and 4C depict certain extensions or placements of anchor content within the corresponding physical spaces, it will be appreciated that the anchor content can be extended across the physical space in other ways. For example, a painting, image, or video that is depicted in object 302 or 402 could be extended across the entire wall corresponding to object 314 or 414, overlaid on one or more objects 302, 304, 306, 308, 310, 312, 402, 404, 406, 408, 410, and/or 412 that are visible from the perspective associated with an AR system providing AR the environment, and/or used to obscure one or more objects 302, 304, 306, 308, 310, 312, 402, 404, 406, 408, 410, and/or 412 that are visible from the perspective associated with an AR system providing AR the environment.

In general, the way in which the anchor content is extended, projected, or placed within a given space can be controlled based on the losses with which a corresponding machine learning model (e.g., machine learning model 200 and/or 280) is trained to generate AR content. For example, a machine learning model could be trained to extend, project, or place various pieces of anchor content within a physical space so that certain objects in the physical space are unaffected by the anchor content, certain objects are depicted as "interacting with" (e.g., supporting, housing, fused with, etc.) the anchor content, certain objects are overlaid with the anchor content, and/or certain objects are obscured by the anchor content.

Figure 5:
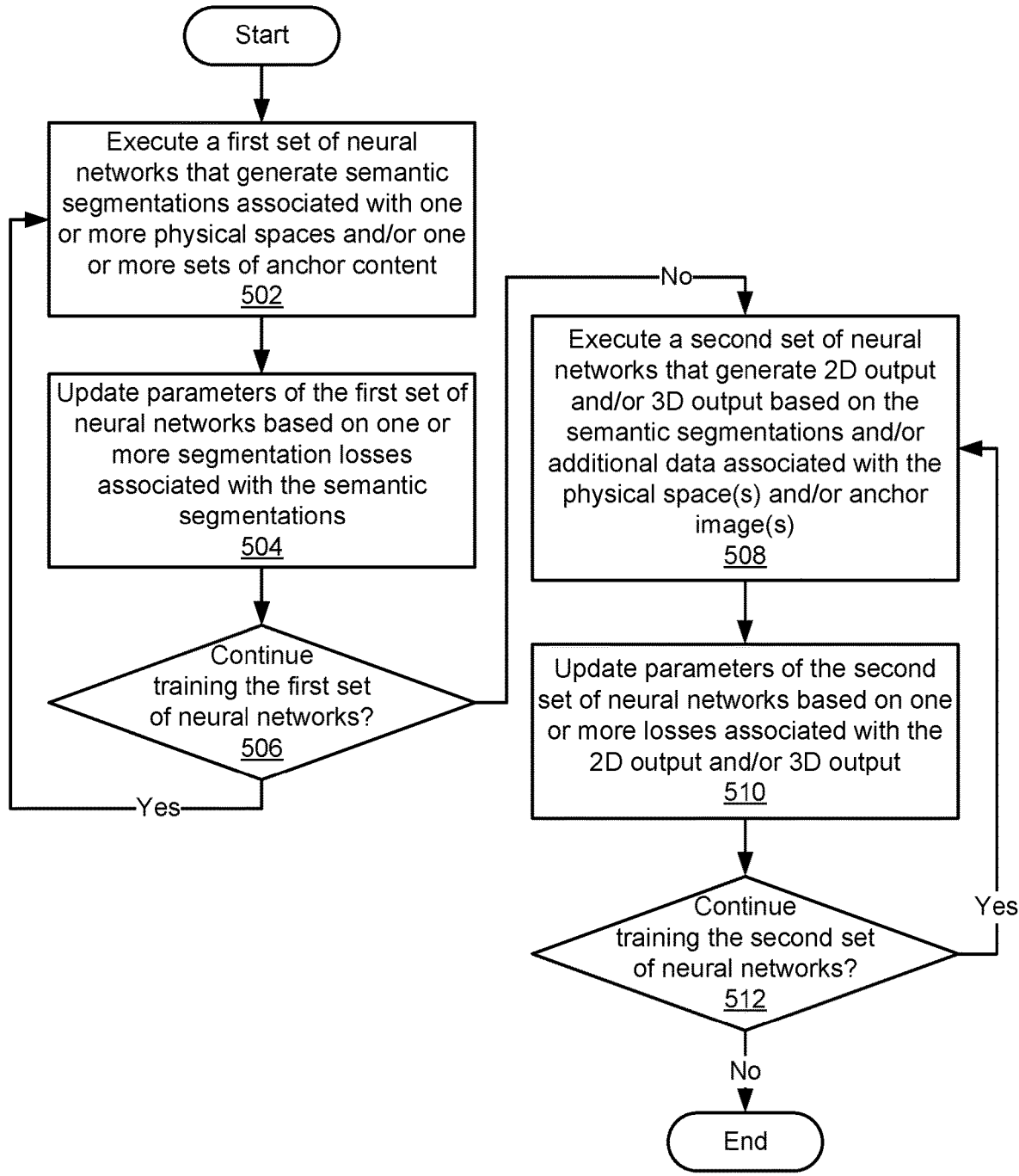
FIG. 5 is a flow diagram of method steps for training a machine learning model to generate AR content that integrates anchor content into physical spaces, according to various embodiments.

FIG. 5 is a flow diagram of method steps for training a machine learning model to generate AR content that integrates anchor content into physical spaces, according to various embodiments. Although the method steps are described in conjunction with the systems of FIGS. 1-2B, persons skilled in the art will understand that any system configured to perform the method steps in any order falls within the scope of the present disclosure.

As shown, in step 502, training engine 122 executes a first set of neural networks that generate semantic segmentations associated with one or more physical spaces and/or one or more sets of anchor content. For example, training engine 122 could input images, point clouds, meshes, depth maps, and/or other sensor data or representations of the physical space(s) into a first segmentation neural network. Training engine 122 could execute the first segmentation neural network to obtain, as output of the first segmentation neural network, predictions of objects (e.g., wall, ceiling, floor, doorway, door, window, fireplace, light fixtures, different types of furniture, different types of decorations, etc.) for different regions of the sensor data. Training engine 122 could also, or instead, input one or more images, video frames, 3D objects, and/or other representations of a given set of anchor content into a second segmentation neural network. Training engine 122 could execute the second segmentation neural network and obtain, as output of the second segmentation neural network, predictions of objects (e.g., people, animals, plants, faces, characters, background, foreground, structures, etc.) for different regions or subsets of the anchor content.

In step 504, training engine 122 updates parameters of the first set of neural networks based on one or more segmentation losses associated with the semantic segmentations. Continuing with the above example, training engine 122 could obtain a first set of ground truth segmentations associated with the sensor data and/or a second set of ground truth segmentations associated with the anchor content. Each ground truth segmentation could include labels that identify objects corresponding to various regions, portions, or subsets of the corresponding sensor data and/or anchor content. Training engine 122 could compute a cross-entropy loss, Dice loss, boundary loss, Tversky loss, and/or another measure of error between a given segmentation outputted by a segmentation neural network and the corresponding ground truth segmentation. Training engine 122 could then use gradient descent and backpropagation to update neural network weights in the segmentation neural network in a way that reduces the measure of error.

In step 506, training engine 122 determines whether or not training of the first set of neural networks is to continue. For example, training engine 122 could determine that each segmentation neural network should continue to be trained using a corresponding segmentation loss until one or more conditions are met. These condition(s) include (but are not limited to) convergence in the parameters of the segmentation neural network, the lowering of the segmentation loss to below a threshold, and/or a certain number of training steps, iterations, batches, and/or epochs. While training of the first set of neural networks continues, training engine 122 repeats steps 502 and 504.

Once training engine 122 determines that training of the first set of neural networks is complete (step 506), training engine 122 proceeds with training a second set of neural networks to generate AR content. More specifically, in step 508, training engine 122 executes the second set of neural networks that generate 2D output and/or 3D output based on the semantic segmentations and/or additional data associated with the physical space(s) and/or anchor content. For example, training engine 122 could use one or more trained segmentation neural networks to generate semantic segmentations of sensor data for the physical space(s) and/or one or more sets of anchor content. Training engine 122 could input the semantic segmentations with the corresponding sensor data and anchor content into an extrapolation network and execute the extrapolation network to generate 2D output that includes one or more images. Each image could combine attributes of a physical space represented by the sensor data with attributes of a set of anchor content. Training engine 122 could also, or instead, input the semantic segmentations with the corresponding sensor data and anchor content into a 3D synthesis network and execute the 3D synthesis network to generate a 3D volume. The 3D volume could include a neural radiance field and/or another representation of a 3D scene that combines visual and semantic attributes associated with the inputted sensor data with visual and semantic attributes associated with the inputted anchor content.

In step 510, training engine 122 updates parameters of the second set of neural networks based on one or more losses associated with the 2D and/or 3D output. Continuing with the above example, training engine 122 could train the extrapolation network by computing a similarity loss as a measure of difference between visual attributes of an extension of the anchor content across a portion of the physical space, as depicted in the 2D output generated by the extrapolation network, and a corresponding portion of anchor content. Training engine 122 could also, or instead, compute a layout loss as a measure of difference between a depiction of a portion of the physical space within the 2D output and a corresponding portion of sensor data for the physical space. Training engine 122 could then use gradient descent and backpropagation to update neural network weights in the extrapolation network in a way that reduces the similarity loss and/or layout loss.

Training engine 122 could train the 3D synthesis network by computing a reconstruction loss based on one or more 3D representations of the anchor content generated by the 3D synthesis network and one or more ground truth 3D objects associated with the anchor content. Training engine 122 could also, or instead, compute a layout loss as a measure of difference between a representation of a subset of the physical space in the first 3D volume and a corresponding subset of sensor data for the physical space. Training engine 122 could also, or instead, compute a different layout loss based on the placement of one or more 3D representations of the anchor content within the first 3D volume. Training engine 122 could also, or instead, compute a similarity loss as a measure of difference between visual attributes of one or more rendered views of anchor content within the 3D volume and a corresponding portion of anchor content. Training engine 122 could then use gradient descent and backpropagation to update neural network weights in the 3D synthesis network in a way that reduces the reconstruction loss, similarity loss, and/or layout loss(es).

In step 512, training engine 122 determines whether or not training of the second set of neural networks is to continue. For example, training engine 122 could determine that the extrapolation network and/or 3D synthesis network should continue to be trained using the corresponding losses until one or more conditions are met. These condition(s) include (but are not limited to) convergence in the parameters of the neural network, the lowering of the losses to below a threshold, and/or a certain number of training steps, iterations, batches, and/or epochs. While training of the second set of neural networks continues, training engine 122 repeats steps 508 and 510. Training engine 122 then ends the process of training the second set of neural networks once the condition(s) are met.

Training engine 122 can also repeat steps 502, 504, 506, 508, 510, and 512 one or more times to continue training the first and/or second sets of neural networks. For example, training engine 122 could alternate between training the first and second sets of neural networks until all losses meet the respective thresholds, each type of training has been performed a certain number of times, and/or another condition is met. Training engine 122 could also, or instead, perform one or more rounds of end-to-end training of the first and second sets of neural networks to optimize the operation of all neural networks to the task of generating AR content from anchor content and depictions of physical spaces.

Figure 6:
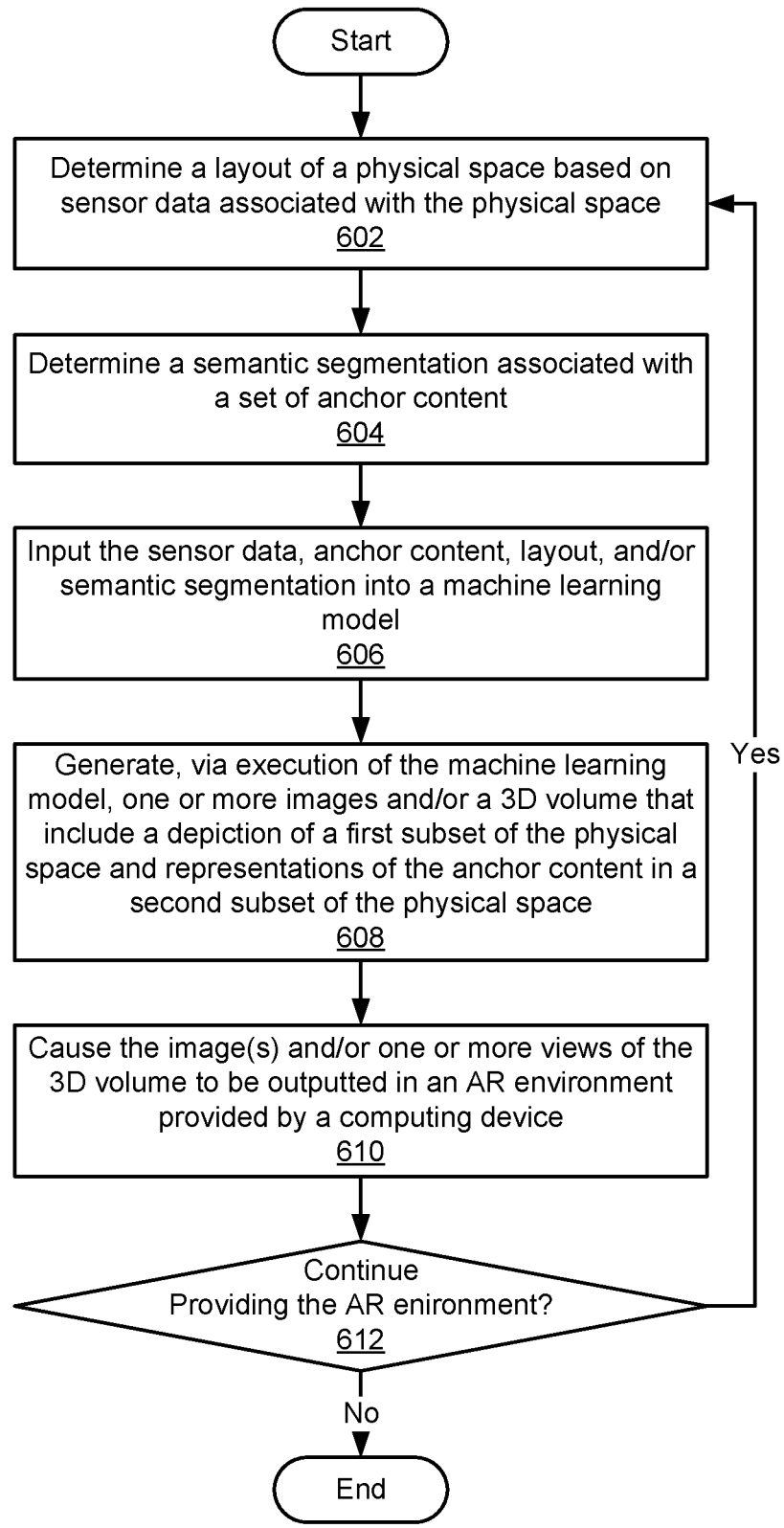
FIG. 6 is a flow diagram of method steps for generating an AR environment that integrates a set of anchor content into a layout of a physical space, according to various embodiments.

FIG. 6 is a flow diagram of method steps for generating an AR environment that integrates a set of anchor content into a layout of a physical space, according to various embodiments. Although the method steps are described in conjunction with the systems of FIGS. 1-2B, persons skilled in the art will understand that any system configured to perform the method steps in any order falls within the scope of the present disclosure.

As shown, in step 602, execution engine 124 determines a layout of a physical space based on sensor data associated with the physical space. For example, execution engine 124 could receive the sensor data as a set of images, a point cloud, a mesh, a depth map, and/or another representation of the visual or spatial attributes of the physical space. Execution engine 124 could also use a first segmentation neural network to generate the layout as a semantic segmentation of the sensor data. The semantic segmentation could include predictions of "real-world" objects (e.g., floor, ceiling, wall, decoration, desk, chair, sofa, rug, painting, etc.) for various regions or subsets of the sensor data.

In step 604, execution engine 124 determines a semantic segmentation associated with a set of anchor content. The set of anchor content can include one or more pieces of anchor content, where a given piece of anchor content can include (but is not limited to) an image, video frame, 2D or 3D shape, texture, audio clip, and/or another type of content to be incorporated into the AR environment. Execution engine 124 can input one or more images, video frames, 3D models, and/or other types of anchor content into a second segmentation neural network. The anchor content can be selected by a user as a subset of sensor data for the physical space and/or provided separately from the sensor data. Execution engine 124 could also obtain the semantic segmentation as output of the second segmentation neural network. The semantic segmentation would include predictions of content-based objects (e.g., faces, characters, worlds, settings, animals, plants, buildings, cars, structures, shapes, etc.) for various regions or subsets of the anchor content.

In step 606, execution engine 124 inputs the sensor data, anchor content, layout, and/or semantic segmentation into a machine learning model. For example, execution engine 124 could input the sensor data, anchor content, layout, and/or semantic segmentation into an extrapolation network that generates 2D output. Execution engine 124 could also, or instead, input the sensor data, anchor content, layout, and/or semantic segmentation into a 3D synthesis network that generates 3D output.

In step 608, execution engine 124 generates, via execution of the machine learning model, one or more images and/or a 3D volume that include a depiction of a first portion of the physical space and representations of the anchor content in a second subset of the physical space. For example, execution engine 124 could use the extrapolation network to generate six images corresponding to six surfaces of a cube that represents a standard box-shaped room. Execution engine 124 could also, or instead, use the extrapolation network to generate one or more images that depict a 360-degree, spherical, and/or another type of "panorama" view of a physical space that is not limited to a box-shaped room. Each image could depict real-world objects in the room, such as (but not limited to) doors, windows, furniture, and/or decorations. Each image could also depict various components of anchor content overlaid onto the walls, floor, ceiling, and/or other surfaces in the room. These components of anchor content could additionally be positioned or distributed within the corresponding images to avoid occluding and/or overlapping with doors, windows, furniture, decorations, and/or other objects in the room.

In another example, execution engine 124 could use the 3D synthesis network to generate 3D output that includes a neural radiance field and/or another representation of a 3D scene. The 3D output could include 3D representations of real-world objects from the physical space, such as (but not limited to) doors, windows, furniture, and/or decorations. The 3D output could also include 2D or 3D objects corresponding to various components of the anchor content that are located in "empty" portions of the room and/or positioned on certain types of surfaces. These components of anchor content could additionally be located in the 3D volume to avoid occluding and/or overlapping with doors, windows, furniture, decorations, and/or other objects in the room. These components of anchor content could also, or instead, be placed in a way that allows the components to "interact" or "blend" with objects in the room.

In step 610, execution engine 124 causes the image(s) and/or one or more views of the 3D volume to be outputted in an AR environment provided by a computing device. For example, execution engine 124 could incorporate the image(s) into visual output generated by a display on the computing device, so that the AR environment appears to depict a semantically meaningful extension of anchor content across the physical space from the perspective of a user interacting with the AR system. In another example, execution engine 124 could use the 3D synthesis network to render a view of the 3D volume from the perspective of the computing device and cause the computing device to output the view to a user.

In step 612, execution engine 124 determines whether or not to continue providing the AR environment. For example, execution engine 124 could determine that the AR environment should be provided while an application implementing the AR environment is running on the computing device and/or while a user interacts with the AR environment. If the AR environment is to be provided, execution engine 124 repeats steps 602, 604, 606, 608, and 610 to update the AR environment in response to changes to the point of view of the computing device, the physical space, and/or the anchor content. For example, execution engine 124 could receive updates the anchor content as "painting" or "drawing" input from the user; cropping, scaling, and/or other transformations of the anchor content; changes to the color balance, saturation, color temperature, exposure, brightness, and/or other color-based attributes of the anchor content; sharpening, blurring, denoising, distortion, or other transformations applied to the anchor content; changes to the view of the anchor content; selection of anchor content from one or more files; and/or playing of a video that includes multiple frames of anchor images. Execution engine 124 could also, or instead, receive additional sensor data that reflects movement in the computing device and/or changes to the physical space. Execution engine 124 could perform step 602 to generate a new layout from the additional sensor data and perform step 604 to generate a semantic segmentation from the anchor content. Execution engine 124 could also perform steps 606 and 608 to generate new 2D or 3D output that combines the physical space from the current point of view with the latest anchor content. Consequently, execution engine 124 generates an immersive AR environment that allows the user to "explore" the semantically meaningful combination of the physical space with the anchor content.

In sum, the disclosed techniques generate AR content that extends or places 2D or 3D representations of photographs, paintings, video frames, rendered scenes, animated scenes, or other types of "anchor" content in physical spaces. A physical space is represented by one or more images, point clouds, meshes, depth maps, and/or other types of sensor data. A machine learning model is used to generate a first semantic segmentation of the sensor data and a second semantic segmentation of the anchor content. The first semantic segmentation includes predictions of objects that are commonly found in rooms (or other types of physical spaces) for different regions or subsets of the sensor data. The second semantic segmentation includes predictions of objects that are commonly associated with anchor content for different regions or subsets of the anchor content.

Another portion of the machine learning model is used to convert the semantic segmentations, sensor data, and anchor content into the AR content. The AR content can include one or more images that depict the physical space from a certain point of view. The images include representations of certain types of real-world objects (e.g., doors, windows, furniture, etc.) in the physical space, as well as extensions of the AR content across other types of real-world objects (e.g., walls, ceiling, floor, etc.) in the physical space. The AR content can also, or instead, include one or more views of a 3D volume generated by the machine learning model. The view(s) could include a depiction of the physical space and a placement of 3D representations of the AR content in various locations within the physical space.

The AR content is outputted in an AR, VR, and/or mixed reality environment provided by a portable electronic device, wearable device, and/or another type of computing device. As changes are made to the position and orientation of the computing device, the physical space, and/or the anchor content, the machine learning model is used to generate updated AR content that reflects changes to the sensor data and/or anchor content. The updated AR content is also outputted in the AR environment to allow a user of the computing device to explore, change, or interact with the AR environment.

One technical advantage of the disclosed techniques relative to the prior art is the ability to automatically and seamlessly generate AR content that combines anchor content with the layout of a physical space. Accordingly, the disclosed techniques are more time- and resource-efficient than conventional approaches that use various software components to convert traditional media content into AR assets and manually place the AR assets within an AR environment. Another technical advantage of the disclosed techniques is the ability to generate AR content "on the fly" from a given set of anchor content and a given physical space. Consequently, the disclosed techniques increase the diversity and availability of AR content that combines traditional media content with layouts of physical spaces. These technical advantages provide one or more technological improvements over prior art approaches.

1. In some embodiments, a computer-implemented method for generating augmented reality content comprises inputting a first layout of a physical space and a first set of anchor content into a machine learning model; generating, via execution of the machine learning model, a first three-dimensional (3D) volume that includes (i) a first subset of the physical space and (ii) a placement of one or more 3D representations of the first set of anchor content in a second subset of the physical space; and causing one or more views of the first 3D volume to be outputted in a computing device.

2. The computer-implemented method of clause 1, wherein generating the first 3D volume comprises applying a first set of neural network layers included in the machine learning model to the first set of anchor content to generate a semantic segmentation of the first set of anchor content; and applying a second set of neural network layers included in the machine learning model to the first layout, the first set of anchor content, and the semantic segmentation to generate the first 3D volume.

3. The computer-implemented method of any of clauses 1-2, wherein generating the first 3D volume comprises applying a first set of neural network layers included in the machine learning model to the first set of anchor content to generate the one or more 3D representations; and applying a second set of neural network layers included in the machine learning model to the one or more 3D representations and the first layout to determine the placement of the one or more 3D representations in the second subset of the physical space.

4. The computer-implemented method of any of clauses 1-3, further comprising generating, via execution of the machine learning model, the first layout as a semantic segmentation of sensor data associated with the physical space.
5. The computer-implemented method of any of clauses 1-4, wherein the sensor data comprises at least one of an image of the physical space, a point cloud, a mesh, or a depth map.
6. The computer-implemented method of any of clauses 1-5, further comprising training the machine learning model based on a set of training layouts, a set of training anchor images, and one or more losses associated with the first 3D volume.
7. The computer-implemented method of any of clauses 1-6, wherein the one or more losses comprise a layout loss that is computed based on a representation of the first subset of the physical space in the first 3D volume and a corresponding subset of the physical space.
8. The computer-implemented method of any of clauses 1-7, wherein the one or more losses comprise a layout loss that is computed based on the first layout and the placement of the one or more 3D representations of the first set of anchor content within the first 3D volume.
9. The computer-implemented method of any of clauses 1-8, wherein the first 3D volume comprises a neural radiance field.
10. The computer-implemented method of any of clauses 1-9, wherein the first set of anchor content comprises at least one of an image, a video, or a 3D object.
11. In some embodiments, one or more non-transitory computer-readable media store instructions that, when executed by one or more processors, cause the one or more processors to perform the steps of inputting a first layout of a physical space and a first set of anchor content into a machine learning model; generating, via execution of the machine learning model, a first three-dimensional (3D) volume that includes (i) a first subset of the physical space and (ii) a placement of one or more 3D representations of the first set of anchor content in a second subset of the physical space; and causing one or more views of the first 3D volume to be outputted in a computing device.
12. The one or more non-transitory computer-readable media of clause 11, wherein the instructions further cause the one or more processors to perform the step of applying a set of neural network layers included in the machine learning model to sensor data associated with the physical space to generate the first layout, wherein the first layout includes predictions of objects for regions of the sensor data.
13. The one or more non-transitory computer-readable media of any of clauses 11-12, wherein the instructions further cause the one or more processors to perform the steps of generating, via execution of the machine learning model, a second 3D volume that includes (i) a third subset of the physical space and (ii) a placement of one or more 3D representations of a second set of anchor content in a fourth subset of the physical space; and causing one or more views of the second 3D volume to be outputted in the computing device.
14. The one or more non-transitory computer-readable media of any of clauses 11-13, wherein the first set of anchor content and the second set of anchor content comprise at least one of different video frames included in a video, depictions of two different scenes, or different sets of 3D objects.
15. The one or more non-transitory computer-readable media of any of clauses 11-14, wherein the instructions further cause the one or more processors to perform the step of training the first machine learning model based on one or more losses associated with the first 3D volume.
16. The one or more non-transitory computer-readable media of any of clauses 11-15, wherein the one or more losses comprise a similarity loss that is computed based on the first set of anchor content and a rendering of the second subset of the physical space within the 3D volume.
17. The one or more non-transitory computer-readable media of any of clauses 11-16, wherein the one or more losses comprise a reconstruction loss that is computed based on the one or more 3D representations of the first set of anchor content generated by the machine learning model and one or more 3D objects.
18. The one or more non-transitory computer-readable media of any of clauses 11-17, wherein the one or more losses comprise a segmentation loss that is computed based on a semantic segmentation of the first set of anchor content and a ground truth segmentation associated with the first set of anchor content.
19. The one or more non-transitory computer-readable media of any of clauses 11-18, wherein causing the one or more views of the first 3D volume to be outputted in the computing device comprises rendering the first 3D volume from the one or more views; and outputting the one or more views within an augmented reality environment provided by the computing device.
20. In some embodiments, a system comprises one or more memories that store instructions, and one or more processors that are coupled to the one or more memories and, when executing the instructions, are configured to perform the steps of inputting a first representation of a physical space and a first set of anchor content into a machine learning model; generating, via execution of the machine learning model, a first three-dimensional (3D) volume that includes (i) a first subset of the physical space and (ii) a placement of one or more 3D representations of the first set of anchor content in a second subset of the physical space; and causing one or more views of the first 3D volume to be outputted in a computing device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating augmented reality content, the method comprising:
   inputting a first layout of a physical space and a first set of anchor content into a machine learning model, wherein the first set of anchor content is represented within the physical space;
   generating, via execution of the machine learning model, a first three-dimensional (3D) volume that includes (i) a first subset of the physical space including the first set of anchor content and (ii) a placement of one or more 3D representations of the first set of anchor content in a second subset of the physical space, wherein:
      the placement of the one or more 3D representations is located at a different position within the physical space relative to a position of the first set of anchor content within the first subset of physical space, and
      generating the first 3D volume comprises:
         applying a first set of neural network layers included in the machine learning model to the first set of anchor content to generate a semantic segmentation of the first set of anchor content, and
         applying a second set of neural network layers included in the machine learning model to the first layout, the first set of anchor content, and the semantic segmentation to generate the first 3D volume; and
   causing one or more views of the first 3D volume to be outputted within an augmented reality environment provided by in a computing device.

2. The computer-implemented method of claim 1, wherein generating the first 3D volume comprises:
   applying a first set of neural network layers included in the machine learning model to the first set of anchor content to generate the one or more 3D representations; and
   applying a second set of neural network layers included in the machine learning model to the one or more 3D representations and the first layout to determine the placement of the one or more 3D representations in the second subset of the physical space.

3. The computer-implemented method of claim 1, further comprising generating, via execution of the machine learning model, the first layout as a semantic segmentation of sensor data associated with the physical space.

4. The computer-implemented method of claim 3, wherein the sensor data comprises at least one of an image of the physical space, a point cloud, a mesh, or a depth map.

5. The computer-implemented method of claim 1, further comprising training the machine learning model based on a set of training layouts, a set of training anchor images, and one or more losses associated with the first 3D volume.

6. The computer-implemented method of claim 5, wherein the one or more losses comprise a layout loss that is computed based on a representation of the first subset of the physical space in the first 3D volume and a corresponding subset of the physical space.

7. The computer-implemented method of claim 5, wherein the one or more losses comprise a layout loss that is computed based on the first layout and the placement of the one or more 3D representations of the first set of anchor content within the first 3D volume.

8. The computer-implemented method of claim 1, wherein the first 3D volume comprises a neural radiance field.

9. The computer-implemented method of claim 1, wherein the first set of anchor content comprises at least one of an image, a video, or a 3D object.

10. One or more non-transitory computer-readable media storing instructions that, when executed by one or more processors, cause the one or more processors to perform the steps of:
inputting a first layout of a physical space and a first set of anchor content into a machine learning model, wherein the first set of anchor content is represented within the physical space;
generating, via execution of the machine learning model, a first three-dimensional (3D) volume that includes (i) a first subset of the physical space including the first set of anchor content and (ii) a placement of one or more 3D representations of the first set of anchor content in a second subset of the physical space, wherein:
the placement of the one or more 3D representations is located at a different position within the physical space relative to a position of the first set of anchor content within the first subset of physical space; and
generating the first 3D volume comprises:
applying a first set of neural network layers included in the machine learning model to the first set of anchor content to generate a semantic segmentation of the first set of anchor content, and
applying a second set of neural network layers included in the machine learning model to the first layout, the first set of anchor content, and the semantic segmentation to generate the first 3D volume; and
causing one or more views of the first 3D volume to be outputted within an augmented reality environment provided by in a computing device.

11. The one or more non-transitory computer-readable media of claim 10, wherein the instructions further cause the one or more processors to perform the step of applying a set of neural network layers included in the machine learning model to sensor data associated with the physical space to generate the first layout, wherein the first layout includes predictions of objects for regions of the sensor data.

12. The one or more non-transitory computer-readable media of claim 10, wherein the instructions further cause the one or more processors to perform the steps of:
generating, via execution of the machine learning model, a second 3D volume that includes (i) a third subset of the physical space and (ii) a placement of one or more 3D representations of a second set of anchor content in a fourth subset of the physical space; and
causing one or more views of the second 3D volume to be outputted in the computing device.

13. The one or more non-transitory computer-readable media of claim 12, wherein the first set of anchor content and the second set of anchor content comprise at least one of different video frames included in a video, depictions of two different scenes, or different sets of 3D objects.

14. The one or more non-transitory computer-readable media of claim 10, wherein the instructions further cause the one or more processors to perform the step of training the first machine learning model based on one or more losses associated with the first 3D volume.

15. The one or more non-transitory computer-readable media of claim 14, wherein the one or more losses comprise a similarity loss that is computed based on the first set of anchor content and a rendering of the second subset of the physical space within the 3D volume.

16. The one or more non-transitory computer-readable media of claim 14, wherein the one or more losses comprise a reconstruction loss that is computed based on the one or more 3D representations of the first set of anchor content generated by the machine learning model and one or more 3D objects.

17. The one or more non-transitory computer-readable media of claim 14, wherein the one or more losses comprise a segmentation loss that is computed based on a semantic segmentation of the first set of anchor content and a ground truth segmentation associated with the first set of anchor content.

18. The one or more non-transitory computer-readable media of claim 10, wherein causing the one or more views of the first 3D volume to be outputted in the computing device comprises:
rendering the first 3D volume from the one or more views; and
outputting the one or more views within an augmented reality environment provided by the computing device.

19. A system, comprising:
one or more memories that store instructions, and
one or more processors that are coupled to the one or more memories and, when executing the instructions, are configured to perform the steps of:
inputting a first layout of a physical space and a first set of anchor content into a machine learning model, wherein the first set of anchor content is represented within the physical space;
generating, via execution of the machine learning model, a first three-dimensional (3D) volume that includes (i) a first subset of the physical space including the first set of anchor content and (ii) a placement of one or more 3D representations of the first set of anchor content in a second subset of the physical space, wherein:
the placement of the one or more 3D representations is located at a different position within the physical space relative to a position of the first set of anchor content within the first subset of physical space; and
generating the first 3D volume comprises:
applying a first set of neural network layers included in the machine learning model to the first set of anchor content to generate a semantic segmentation of the first set of anchor content, and
applying a second set of neural network layers included in the machine learning model to the first layout, the first set of anchor content, and the semantic segmentation to generate the first 3D volume; and
causing one or more views of the first 3D volume to be outputted within an augmented reality environment provided by in a computing device.

* * * * *